United States Patent
Ellis

(10) Patent No.: US 11,318,865 B2
(45) Date of Patent: May 3, 2022

(54) AUTONOMOUS VEHICLE HAVING A CONFIGURABLE PASSENGER SEAT

(71) Applicant: UATC, LLC, San Francisco, CA (US)

(72) Inventor: Johad Husseini Ellis, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 217 days.

(21) Appl. No.: 16/720,660

(22) Filed: Dec. 19, 2019

(65) Prior Publication Data
US 2021/0178934 A1    Jun. 17, 2021

Related U.S. Application Data

(60) Provisional application No. 62/947,658, filed on Dec. 13, 2019.

(51) Int. Cl.
*B60N 2/02* (2006.01)
*B62D 1/183* (2006.01)
*B60N 2/01* (2006.01)
*G05D 1/02* (2020.01)

(52) U.S. Cl.
CPC .......... *B60N 2/0244* (2013.01); *B60N 2/01* (2013.01); *B62D 1/183* (2013.01); *G05D 1/021* (2013.01); *G05D 2201/0213* (2013.01)

(58) Field of Classification Search
CPC ........ B60N 2/0244; B60N 2/01; B60N 2/143; B60N 2002/0055; B60N 2/06; B62D 1/183; G05D 2201/0213; G05D 1/021
USPC ......................................................... 701/49
See application file for complete search history.

(56) References Cited

U.S. PATENT DOCUMENTS

| 10,351,159 | B2 * | 7/2019 | King | B62D 1/183 |
| 10,363,958 | B2 * | 7/2019 | Otto | B62D 1/286 |
| 10,399,462 | B2 * | 9/2019 | Yamada | B60N 2/0244 |
| 2007/0198145 | A1 * | 8/2007 | Norris | G05D 1/0061 |
| | | | | 701/23 |
| 2011/0233951 | A1 * | 9/2011 | Zekavica | B60N 2/305 |
| | | | | 296/24.34 |
| 2015/0137492 | A1 * | 5/2015 | Rao | B60R 21/233 |
| | | | | 280/729 |
| 2015/0142273 | A1 * | 5/2015 | Cuddihy | B60N 2/06 |
| | | | | 701/49 |
| 2019/0232843 | A1 * | 8/2019 | Welch | B60N 2/5621 |
| 2019/0316322 | A1 * | 10/2019 | Haller | B60N 2/20 |

(Continued)

*Primary Examiner* — Jonathan M Dager
*Assistant Examiner* — Jean W Charleston
(74) *Attorney, Agent, or Firm* — Dority & Manning, P.A.

(57) ABSTRACT

An autonomous vehicle is provided. The autonomous vehicle includes a vehicle control device positioned proximate a forward end of the autonomous vehicle. The autonomous vehicle further includes a passenger seat. The passenger seat defines a seating orientation and is configurable in at least a first position and a second position. When the passenger seat is in the first position, the seating orientation is directed towards the rear end of the autonomous vehicle. In addition, the vehicle control device is substantially obscured from access from a passenger compartment of the autonomous vehicle. When the passenger seat is in the second position, the seating orientation is directed towards the forward end of the autonomous vehicle. In addition, the vehicle control device is accessible from the passenger compartment of the autonomous vehicle.

20 Claims, 15 Drawing Sheets

(56) References Cited

U.S. PATENT DOCUMENTS

2019/0384305 A1* 12/2019 Niibo .................... B60W 30/14
2020/0101998 A1*  4/2020 Nishimura ........... B60N 2/0244
2020/0130723 A1*  4/2020 Cao ........................ B62D 1/181

* cited by examiner

AUTONOMOUS VEHICLE HAVING A CONFIGURABLE PASSENGER SEAT

RELATED APPLICATION

The present application is based on and claims benefit of U.S. Provisional Patent Application No. 62/974,658 having a filing date of Dec. 13, 2019, which is incorporated by reference herein.

FIELD

The present disclosure relates generally to autonomous vehicle and, more particularly, a configurable passenger seat for an autonomous vehicle.

BACKGROUND

Robots, including autonomous vehicles, can receive data that is used to determine a predicted trajectory for objects in an environment through which the robot travels. Robots can rely on predicted trajectories to perform various operations. Thus, effective operation of a robot may depend on the accuracy of the determination of the predicted trajectory. Machine-learning techniques can be used to increase the accuracy of such predictions.

SUMMARY

Aspects and advantages of embodiments of the present disclosure will be set forth in part in the following description, or may be learned from the description, or may be learned through practice of the embodiments.

One example aspect of the present disclosure is directed to an autonomous vehicle. The autonomous vehicle. The autonomous vehicle includes a vehicle control device positioned proximate a forward end of the autonomous vehicle. The autonomous vehicle further includes a first passenger seat. The first passenger seat defines a seating orientation and is configurable between at least a first position and a second position. The autonomous vehicle further includes a second passenger seat. The second passenger seat faces a rear end of the autonomous vehicle. When the first passenger seat is in the first position, the seating orientation is directed towards the rear end of the autonomous vehicle. In addition, the vehicle control device is substantially obscured from access from a passenger compartment of the autonomous vehicle. When the first passenger seat is in the second position, the seating orientation is directed towards the forward end of the autonomous vehicle. In addition, the vehicle control device is accessible from the passenger compartment of the autonomous vehicle.

Another example aspect of the present disclosure is directed to a method of configuring an autonomous vehicle having a first passenger seat and a second passenger seat to be manually controlled via a vehicle control device of the autonomous vehicle. The method includes obtaining, by a vehicle computing system comprising one or more processors, data associated with moving the first passenger seat of the autonomous vehicle from a first position in which a seating orientation of the first passenger seat faces a rear end of the autonomous vehicle to a second position in which the seating orientation of the first passenger seat faces a front end of the autonomous vehicle. In response to obtaining the data, the method further includes configuring, by the vehicle computing system, the vehicle control device to allow the autonomous vehicle to be manually controlled via the vehicle control device.

Yet another example aspect of the present disclosure is directed to an interior of an autonomous vehicle. The interior of the autonomous vehicle includes a vehicle control device positioned proximate a forward end of the autonomous vehicle. The interior of the autonomous vehicle further includes a first passenger seat. The first passenger seat defines a seating orientation and is configurable between at least a first position and a second position. The interior of the autonomous vehicle further includes a second passenger seat. The second passenger seat faces a rear end of the autonomous vehicle. When the first passenger seat is in the first position, the seating orientation is directed towards the rear end of the autonomous vehicle. In addition, the vehicle control device is substantially obscured from access from a passenger compartment of the autonomous vehicle. When the first passenger seat is in the second position, the seating orientation is directed towards the forward end of the autonomous vehicle. In addition, the vehicle control device is accessible from the passenger compartment of the autonomous vehicle.

Other example aspects of the present disclosure are directed to other systems, methods, vehicles, apparatuses, tangible non-transitory computer-readable media, and devices for controlling the motion of an autonomous vehicle and configuring the interior of an autonomous vehicle to permit/prevent such motion control.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
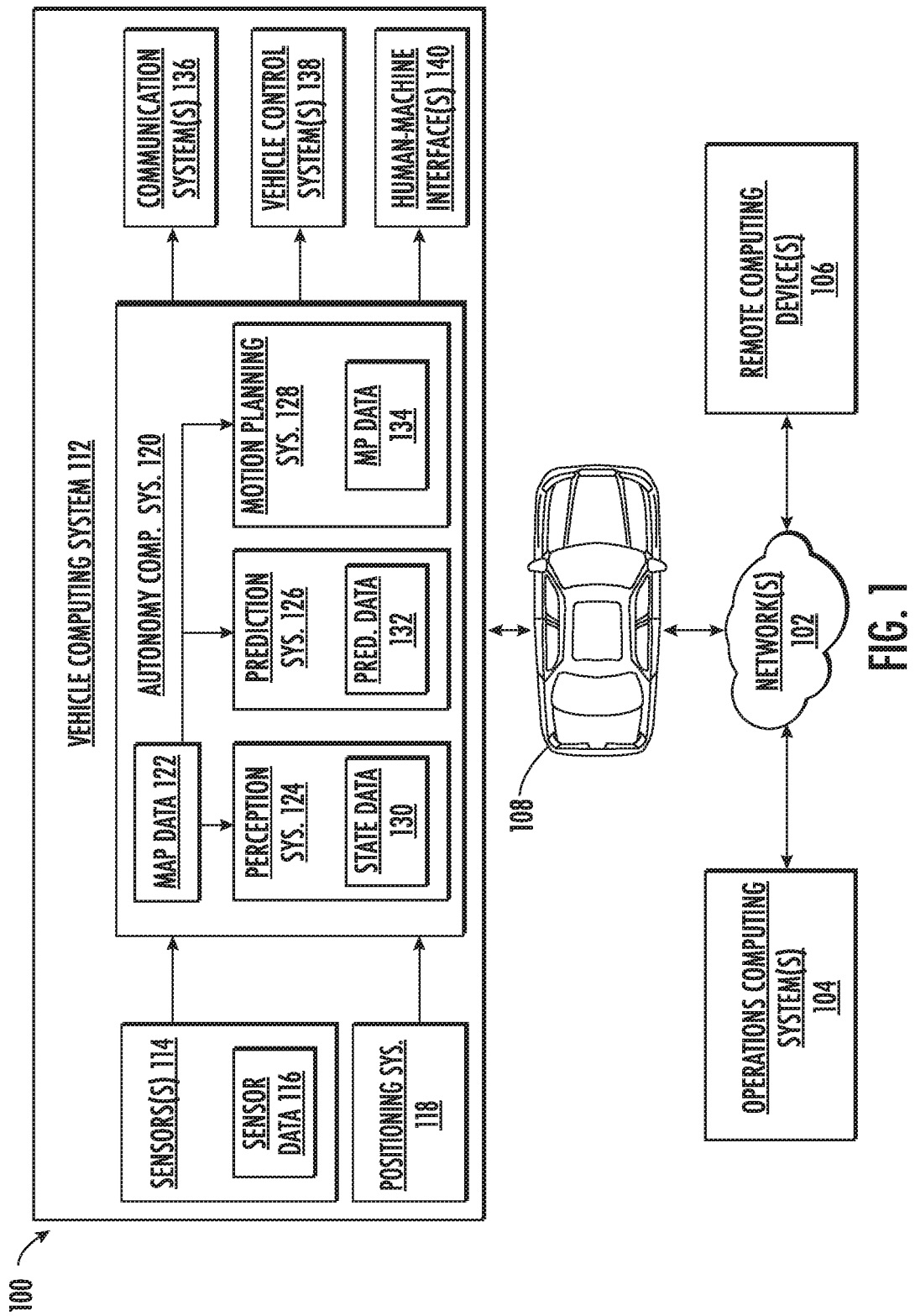
FIG. 1 depicts a block diagram of an example system for controlling the computational functions of an autonomous vehicle according to example embodiments of the present disclosure.

Example aspects of the present disclosure are directed to an autonomous vehicle having a passenger seat configurable (e.g., movable) in at least a first position and a second position to selectively allow a passenger of the autonomous vehicle to manually control the autonomous vehicle using a vehicle control device of the autonomous vehicle. When the passenger seat is in the first position, a seating orientation of the passenger seat faces a first end (e.g., rear end) of the autonomous vehicle such that a passenger seated in the passenger seat faces away from the vehicle control device. Moreover, when the passenger seat is in the first position, the passenger seat can at least partially obscure the vehicle control device from the view of the passengers of the autonomous vehicle. In this manner, the appearance of the vehicle control device can be minimized to prevent unwanted manipulation of the vehicle control device by the passengers. When the passenger seat is in the second position, the seating orientation of the passenger seat faces a second end (e.g., forward end with a windshield) of the autonomous vehicle such that a passenger seated in the passenger seat faces the vehicle control device. In this manner, the flexibility of the interior of the autonomous vehicle can be improved to, at least partially, hide or obscure the vehicle control device from the passengers while riding within the autonomous vehicle and, if needed, adjust the seating orientation of the passenger seat so that a passenger can use the vehicle control device to manually control the autonomous vehicle.

An autonomous vehicle (e.g., ground-based vehicle, aerial vehicle, etc.) can include various systems and devices configured to control the operation of the autonomous vehicle. For example, an autonomous vehicle can include an onboard vehicle computing system (e.g., located on or within the autonomous vehicle) that is configured to operate the autonomous vehicle. The onboard vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. Moreover, an autonomous vehicle can include a communications system that can allow the autonomous vehicle to communicate with a computing system that is remote from the autonomous vehicle such as, for example, that of a service entity.

An autonomous vehicle can perform vehicle services for one or more service entities. A service entity can be associated with the provision of one or more vehicle services. For example, a service entity can be an individual, a group of individuals, a company (e.g., a business entity, organization, etc.), a group of entities (e.g., affiliated companies), and/or another type of entity that offers and/or coordinates the provision of vehicle service(s) to one or more users. As an example, a service entity can offer vehicle service(s) to users via a software application (e.g., on a user computing device), via a website, and/or via other types of interfaces that allow a user to request a vehicle service. The vehicle services can include user transportation services (e.g., by which the vehicle transports user(s) from one location to another), delivery services (e.g., by which a vehicle delivers item(s) to a requested destination location), courier services (e.g., by which a vehicle retrieves item(s) from a requested origin location and delivers the item to a requested destination location), and/or other types of services.

An operations computing system of the service entity can help to coordinate the performance of vehicle services by autonomous vehicles. For instance, the operations computing system can include a service platform. The service platform can include a plurality of back-end services and front-end interfaces, which are accessible via one or more APIs. For example, an autonomous vehicle and/or another computing system that is remote from the autonomous vehicle can communicate/access the service platform (and its backend services) by calling the one or more APIs. Such components can facilitate secure, bidirectional communications between autonomous vehicles and/or the service entity's operations system (e.g., including a data center, etc.).

The service platform can allow an autonomous vehicle to obtain data from and/or communicate data to the operations computing system. By way of example, a user can provide (e.g., via a user device) a request for a vehicle service to the operations computing system associated with the service entity. The request can indicate the type of vehicle service that the user desires (e.g., a user transportation service, a delivery service, etc.), one or more locations (e.g., an origin, destination, etc.), timing constraints (e.g., pick-up time, drop-off time, deadlines, etc.), a number of user(s) and/or items to be transported in the vehicle, other service parameters (e.g., a need for handicap access, handle with care instructions, etc.), and/or other information. The operations computing system of the service entity can process the request and identify one or more autonomous vehicles that may be able to perform the requested vehicle services for the user. For instance, the operations computing system can identify which autonomous vehicle(s) are online with the service entity (e.g., available for a vehicle service assignment, addressing a vehicle service assignment, etc.). An autonomous vehicle can go online with a service entity by, for example, connecting with the service entity's operations computing system (e.g., the service platform) so that the vehicle computing system can communicate with the operations computing system via a network. Once online, the operations computing system can communicate a vehicle service assignment indicative of the requested vehicle services and/or other data to the autonomous vehicle.

The autonomous vehicle can be configured to operate in one or more modes including, for example, a fully autonomous operating mode, a semi-autonomous operating mode, and a manual operating mode. The fully autonomous (e.g., self-driving) operating mode can be one in which the autonomous vehicle can provide driving and navigational operation with minimal and/or no interaction from a human driver present in the autonomous vehicle. The semi-autonomous operating mode can be one in which the vehicle can operate with some interaction from a human driver present in the vehicle. The manual operating mode can be one in which a human driver present in the autonomous vehicle manually controls (e.g., acceleration, braking, steering) the autonomous vehicle via one or more input devices (e.g., steering device) of the autonomous vehicle.

Under certain circumstances, it may be beneficial to allow a user (e.g., a passenger of a transportation service) to manually operate the autonomous vehicle. For example, the onboard vehicle computing system of the autonomous vehicle (or a remote computing system) may detect one or more triggering events that can lead to the autonomous vehicle switching from the fully autonomous operating mode to the semi-autonomous operating mode or the manual operating mode. These triggering events can include, for example, a damaged sensor, a failure of the autonomy software, or any other suitable type of triggering event in which it would be beneficial to switch the autonomous vehicle from the fully-autonomous operating mode to the semi-autonomous operating mode or the manual operating mode.

The autonomous vehicle (ore a remote computing system) can detect the triggering events and determine one or more action(s) to be performed by the systems on-board the autonomous vehicle in response to the triggering event. In some implementations, the action(s) can be based at least in part on whether the autonomous vehicle is in a first state (e.g., in which a passenger is present) or a second state (e.g., in which no passenger present). For example, in the event that the passenger is not present in the autonomous vehicle, the action(s) can include stopping a motion of the vehicle. Such a response can be appropriate when the vehicle is unable to autonomously navigate (e.g., due to a lack of communicability with the autonomy system). As such, the onboard computing system of the autonomous vehicle (or a remote computing system) can communicate with vehicle control components of the autonomous vehicle to decelerate and/or steer the autonomous vehicle until the autonomous vehicle reaches a stopped position. In the event that a passenger is present in the autonomous vehicle, the action(s) can include allowing the passenger to manually control the autonomous vehicle. In such an instance, the onboard vehicle computing system of the autonomous vehicle (or a remote computing system) can send one or more control signals to cause the autonomous vehicle to enter into the semi-autonomous operating mode or the manual operating mode such that the autonomous vehicle can be controlled based at least in part on user input from the passenger via a vehicle control device (e.g., steering device) of the autonomous vehicle. In such a scenario, the autonomous vehicle may also perform a safe stop maneuver so that the passenger can be oriented to take control of the autonomous vehicle (e.g., while the vehicle is stationary). The onboard vehicle computing system of the autonomous vehicle (or a remote computing system) can be configured to permit a passenger to control the autonomous vehicle in scenarios in which the vehicle's passengers would not be placed in danger.

According to the present disclosure, the interior of the autonomous vehicle can be flexibly configured to allow the seating orientation of a passenger seat of the autonomous vehicle to be adjusted from a passenger-like position or seating orientation to a driver-like position or seating orientation in which the passenger can access a vehicle control device necessary to manually control the autonomous vehicle. In some implementations, the vehicle control device can be positioned proximate (e.g., closer to forward end of autonomous vehicle than rear end of autonomous vehicle) the forward end of the autonomous vehicle. It should be appreciated, however, that the vehicle control device can be positioned at any suitable location within the interior of the autonomous vehicle.

The interior of an autonomous vehicle can define a passenger compartment configured to accommodate at least a first passenger seat and a second passenger seat. In some implementations, the first passenger seat and the second passenger seat can be arranged in a side-by-side configuration to form a row of seats that separates the vehicle control device from the passenger compartment. In such implementations, the first passenger seat and the second passenger seat are positioned such that a seating orientation of both the first passenger seat and the second passenger seat is directed towards a first end (e.g., rear end) of the autonomous vehicle. Accordingly, a passenger seated in the first passenger seat or the second passenger seat faces away from the vehicle control device. In this manner, the passenger cannot manually control the autonomous vehicle via the vehicle control device when the seating orientation of both the first passenger seat and the second passenger seat face the first end of the autonomous vehicle.

When the seating orientation of the first passenger seat and the second passenger seat faces the first end of the autonomous vehicle, a seatback of the first passenger seat and a seatback of the second passenger seat can, in some implementations, be positioned along a longitudinal direction of the autonomous vehicle between a first pillar (e.g., A-pillar) of the autonomous vehicle and a second pillar (e.g., B-pillar) of the autonomous vehicle. It should be understood that the longitudinal direction of the autonomous vehicle extends between the first end (e.g., forward end having a windshield) of the autonomous vehicle and the second end (e.g., rear end) of the autonomous vehicle, whereas a lateral direction of the autonomous vehicle extends between opposing sides (e.g., first side, second side) of the autonomous vehicle and is substantially perpendicular to the longitudinal direction. The autonomous vehicle can further define a vertical direction that extends between a top portion of the autonomous vehicle and a bottom portion of the autonomous vehicle and is substantially perpendicular to both the lateral direction and the longitudinal direction. The first pillar can frame, at least in part, an opening for a windshield of the autonomous vehicle. The second pillar can frame, at least in part, an opening for a door movable between an open position and a closed position to allow the passenger(s) to access the passenger compartment.

The seatback of the first passenger seat can help keep the vehicle control device inaccessible and/or at least partially obscured from the passenger(s) with in the passenger compartment. For example, in some implementations, the seatback of the first passenger seat can contact the vehicle control device (e.g., steering device). In this manner, movement (and/or a full view) of the vehicle control device can be prevented. In some implementations, the vehicle control device can include one or more input devices (e.g., buttons, GUI elements on a display device, etc.) configured to receive user-input associated with accelerating or braking the autonomous vehicle. In such implementations, the seatback of the first passenger seat can be spaced apart from the vehicle control device along the longitudinal direction of the autonomous vehicle by any suitable distance needed to prevent the seatback of the first passenger seat from contacting the one or more input devices of the vehicle control device. In this manner, inadvertent manipulation of the one or more input devices via the seatback of the first passenger seat can be prevented. The distance between the vehicle control device and the seatback of the first passenger seat along the longitudinal direction can also be small enough such that the vehicle control device is still substantially obscured (e.g., at least 50% of vehicle control device is blocked from view) from the autonomous vehicle's passenger(s)/passenger compartment. For example, the distance between the vehicle control device and the seatback can be four inches or less. This can help to prevent unwanted manipulation of the vehicle control device, while still obscuring the view of the vehicle control device from the view of passengers within the passenger compartment.

The seating orientation of the first passenger seat can be adjusted to allow the passenger to manually control the autonomous vehicle. For example, the first passenger seat is configurable in at least a first position and a second position to selectively allow a passenger to manually control the autonomous vehicle via the vehicle control device. More specifically, the first passenger seat is movable between at least the first position and the second position. When the first passenger seat is in the first position, the seating orientation of the first passenger seat faces the first end (e.g., rear end) of the autonomous vehicle such that a passenger seated in the first passenger seat faces away from the vehicle control device. In this manner, the passenger cannot manually control the autonomous vehicle via the vehicle control device when the first passenger seat is in the first position.

When the first passenger seat is in the second position, the seating orientation of the first passenger seat faces the second end (e.g., forward end with a windshield) of the autonomous vehicle such that a passenger seated in the first passenger seat faces the vehicle control device. In this manner, the passenger can manually control the autonomous vehicle via the vehicle control device when the first passenger seat is in the second position. In some implementations, the vehicle control device can be locked and/or disabled (e.g., when the first passenger seat is in the first position) and the onboard vehicle computing system of the autonomous vehicle can send control signal(s) to unlock and/or enable the vehicle control device so that the passenger can manipulate (e.g., provide user-input) the vehicle control device to manually control the autonomous vehicle (e.g., when the first passenger seat is in the second position).

In some implementations, the first passenger seat can be removably coupled to a frame. In this manner, the first passenger seat can be decoupled (e.g., released) from the frame to allow the passenger to move the first passenger seat from the first position to the second position or vice versa. In some implementations, the first passenger seat can be removably coupled to the frame via manipulation of a locking device (e.g., latch, hook). In such implementations, the first passenger seat can be decoupled from the frame via manipulation of the locking device by the passenger. When the first passenger seat is decoupled from the frame, the passenger can move the first passenger seat from the first position to the second position or vice versa. Furthermore, the first passenger seat can be recoupled to the frame when the passenger has finished moving the first passenger seat. For example, in some implementations, the passenger can apply a force to the first passenger seat when the first passenger seat is positioned on the frame in either the first position or the second position to recouple the first passenger seat to the frame (e.g., via the locking device).

In some implementations, the first passenger seat can be rotatably coupled to the frame. For example, the first passenger seat can be rotatably coupled to the frame via a swivel or any other suitable type of device that allows the first passenger seat to rotate relative to the frame. In this manner, the first passenger seat can rotate from the first position to the second position and vice versa while the first passenger seat is secured to the frame. In some implementations, the autonomous vehicle can include an input device configured to receive a user-input associated with rotating the first passenger seat between the first position and the second position. The input device can include, for example, a press-button, switching device, GUI elements on a display device or any other suitable type of input device configured to receive user-input associated with rotating the first passenger seat from the first position to the second position or vice versa. In such implementations, an electric motor, servo, hydraulic system, and/or other means configured to drive rotation of the first passenger seat from the first position to the second position or vice versa can be activated each time the input device receives the user-input. In this manner, the electric motor, etc. can drive rotation of the first passenger seat from the first position to the second position or vice versa.

In some implementations, the first passenger seat can be mounted to a frame that is movable along a first track that extends along the longitudinal direction of the autonomous vehicle. In this manner, the first passenger seat can move along the first track to adjust a position of the first passenger seat along the longitudinal direction of the autonomous vehicle. In some implementations, the autonomous vehicle can include one or more input devices (e.g., press-button, switching device, GUI elements on a display device, etc.) configured to receive user-input associated with moving the first passenger seat along the first track. For instance, the user-input can be associated with adjusting a distance between the first passenger seat and the vehicle control device when the first passenger seat is in the second position to provide leg room for the passenger seated in the first passenger seat.

In some implementations, the second passenger seat can be mounted to a frame that is movable along a second track that is different than the first track. The second track can extend along the longitudinal direction of the autonomous vehicle. In this manner, the second passenger seat can move along the second track to adjust a position of the second passenger seat along the longitudinal direction. In some implementations, the autonomous vehicle can include an input device (e.g., press-button, switching device, GUI elements on a display device, etc.) configured to receive a user-input associated with moving the second passenger seat along the second track.

In some implementations, the second passenger seat can move along the second track prior to the first passenger seat rotating from the first position to the second position or vice versa. For instance, the second passenger seat can move along the second track until the second passenger seat is spaced apart from the first passenger seat along the longitudinal direction of the autonomous vehicle by a distance needed to allow the first passenger seat to rotate from the first position to the second position without contacting (e.g., touching) the second passenger seat. For instance, the second passenger seat can move along the second track until the seatback of the second passenger seat is positioned along the longitudinal direction between the second pillar (e.g., B-pillar) and the third pillar (e.g., C-pillar) of the autonomous vehicle. In this manner, the seatback of the second passenger seat can be spaced apart from the seatback of the first passenger seat along the longitudinal direction by a distance needed to allow the first passenger seat to rotate from the first position to the second position without contacting the second passenger seat.

In some implementations, the second passenger seat can be positioned between the first passenger seat and a side window of the autonomous vehicle along a lateral direction of the autonomous vehicle. In such implementations, the second passenger seat can move along the second track until the second passenger seat no longer obstructs the passenger's view out the side window when the passenger is seated in the first passenger seat and the first passenger seat is in the second position. For instance, the second passenger seat can move along the second track until the seatback of the second passenger seat is positioned along the longitudinal direction between the second pillar of the autonomous vehicle and the third pillar of the autonomous vehicle. In this manner, the passenger seated in the first passenger seat can see out the passenger side window while manually controlling the autonomous vehicle via the vehicle control device.

In some implementations, the onboard vehicle computing system of the autonomous vehicle can be configured to provide a notification (e.g., audible, visual, etc.) when the first passenger seat is in the second position and the second passenger seat is positioned along the longitudinal direction such that the second passenger seat (e.g., the seatback thereof) obstructs the passenger's view out of the side window when the passenger is seated in the first passenger seat. In this manner, the notification can prompt the passenger to provide user-input associated with moving the second passenger seat along the second track until the seatback of the second passenger seat no longer obstructs the passenger's view out the side window.

In some implementations, the onboard vehicle computing system of the autonomous vehicle can be configured to obtain data associated with moving the second passenger seat from the first position to the second position. For example, the data can be associated with a user-request to manually operate the autonomous vehicle. In particular, the data can be associated with a user-request to move the first passenger seat from the first position to the second position. As another example, the data can be associated with detection of a failure event associated with the autonomous vehicle. For example, in some implementations, the failure event can occur when the autonomous vehicle is located in a space or area that the autonomous vehicle cannot navigate without human-interaction.

In some implementations, the vehicle control device can be movable between a stowed position and a deployed position based on a position (e.g., first position, second position) of the first passenger seat. When the first passenger seat is in the first position, the vehicle control device can be in the stowed position. In some implementations, the vehicle control device can be entirely disposed within an interior of a dashboard of the autonomous vehicle when the vehicle control device is in the deployed position. In this manner, the vehicle control device can be entirely hidden from view when the first passenger seat is in the first position. When the first passenger seat is in the second position, the vehicle control device can be in the deployed position. In some implementations, at least a portion of the vehicle control device is disposed outside of the interior of the dashboard when the vehicle control device is in the deployed position. In this manner, the vehicle control device can be accessible to allow the passenger seated in the first passenger seat to manually control the autonomous vehicle via the vehicle control device.

In some implementations, the dashboard can define an opening that the vehicle control device passes through when moving from the stowed position to the deployed position and vice versa. In such implementations, the vehicle control device can have a first shape in the stowed position and a second shape that is different than the first shape in the deployed position. For example, the first shape can correspond to a shape of the opening the vehicle control device passes through when moving from the stowed position to the deployed position and vice versa. In particular, the first shape can be substantially triangular, whereas the second shape can be substantially circular.

In some implementations, the vehicle control device can include a display device having a display screen. The display screen can be configured to display one or more notifications indicative of operation of the autonomous vehicle. For instance, in some implementations, the display screen can display a notification to prompt the user to provide user-input associated with moving the second passenger seat along the second track such that the second passenger seat does not obstruct the passenger's view out the side window of the autonomous vehicle when seated in the first passenger seat and manually controlling the autonomous vehicle via the vehicle control device.

An autonomous vehicle in accordance with the present disclosure can provide numerous technical effects and benefits. The technology of the present disclosure can allow an interior of the autonomous vehicle to be selectively configured based on the circumstances of the autonomous vehicle. By way of example, as described herein, a passenger seat of the autonomous vehicle can be adjusted such that a passenger can be prevented from manipulating a vehicle control device (e.g., steering device) of the autonomous vehicle in some circumstances (e.g., while the passenger is riding for a transportation service), while also allowing the passenger to access and manually control the autonomous vehicle in other circumstances (e.g., when the vehicle needs to be manually controlled to travel around an obstacle).

Moreover, technology of the present disclosure can help hide the vehicle control device from the view of the passenger(s) and reduce the opportunity for unwanted manipulation of the vehicle control device by a passenger of the autonomous vehicle. For example, as described herein, the seatback of the passenger seat can at least partially obscure the vehicle control device from the passenger's view when the passenger seat is in the first position and/or the vehicle control device can be stored in stowed position. In this manner, the appearance of the vehicle control device when the passenger seat is in the first position can be minimized relative to the appearance of the vehicle control device when the passenger seat is in the second position. Additionally, the passenger seat can help reduce the accessibility of the vehicle control device to the passenger(s). For example, in some implementations, the seatback of a passenger can contact the vehicle control device to prevent movement of the vehicle control device when the passenger seat is in the first position. In this manner, the technology described herein can help increase the safety of the autonomous vehicle by reducing the opportunity for unwanted manipulation of the vehicle control device by the passenger of the autonomous vehicle.

Referring now to the FIGS., FIG. 1 depicts a system 100 that includes a communications network 102; an operations computing system 104; one or more remote computing devices 106; a vehicle 108; a vehicle computing system 112; one or more sensors 114; sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service provider that can provide one or more vehicle services to a plurality of users via a fleet of vehicles that includes, for example, the vehicle 108. The vehicle services can include transportation services (e.g., rideshare services), courier services, delivery services, and/or other types of services.

The operations computing system 104 can include multiple components for performing various operations and functions. For example, the operations computing system 104 can be configured to monitor and communicate with the vehicle 108 and/or its users to coordinate a vehicle service provided by the vehicle 108. To do so, the operations computing system 104 can communicate with the one or more remote computing devices 106 and/or the vehicle 108 via one or more communications networks including the communications network 102. The communications network 102 can send and/or receive signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 102 can include a local area network (e.g. intranet), wide area network (e.g. the Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 108.

Each of the one or more remote computing devices 106 can include one or more processors and one or more memory devices. The one or more memory devices can be used to store instructions that when executed by the one or more processors of the one or more remote computing devices 106 cause the one or more processors to perform operations and/or functions including operations and/or functions associated with the vehicle 108 including sending and/or receiving data or signals to and from the vehicle 108, monitoring the state of the vehicle 108, and/or controlling the vehicle 108. The one or more remote computing devices 106 can communicate (e.g., exchange data and/or signals) with one or more devices including the operations computing system 104 and the vehicle 108 via the communications network 102. For example, the one or more remote computing devices 106 can request the location of the vehicle 108 or a state of one or more objects detected by the one or more sensors 114 of the vehicle 108, via the communications network 102.

The one or more remote computing devices 106 can include one or more computing devices (e.g., a desktop computing device, a laptop computing device, a smart phone, and/or a tablet computing device) that can receive input or instructions from a user or exchange signals or data with an item or other computing device or computing system (e.g., the operations computing system 104). Further, the one or more remote computing devices 106 can be used to determine and/or modify one or more states of the vehicle 108 including a location (e.g., a latitude and longitude), a velocity, an acceleration, a trajectory, a heading, and/or a path of the vehicle 108 based, at least in part, on signals or data exchanged with the vehicle 108. In some implementations, the operations computing system 104 can include the one or more remote computing devices 106.

The vehicle 108 can be a ground-based vehicle (e.g., an automobile, a motorcycle, a train, a tram, a bus, a truck, a tracked vehicle, a light electric vehicle, a moped, a scooter, and/or an electric bicycle), an aircraft (e.g., airplane or helicopter), a boat, a submersible vehicle (e.g., a submarine), an amphibious vehicle, a hovercraft, a robotic device (e.g. a bipedal, wheeled, or quadrupedal robotic device), and/or any other type of vehicle. The vehicle 108 can be an autonomous vehicle that can perform various actions including driving, navigating, and/or operating, with minimal and/or no interaction from a human driver. The vehicle 108 can be configured to operate in one or more modes including, for example, a fully autonomous operational mode, a semi-autonomous operational mode, a manual operating mode, a park mode, and/or a sleep mode. A fully autonomous (e.g., self-driving) operational mode can be one in which the vehicle 108 can provide driving and navigational operation with minimal and/or no interaction from a human driver present in the vehicle. A semi-autonomous operational mode can be one in which the vehicle 108 can operate with some interaction from a human driver present in the vehicle. A manual operating mode can be one in which a human driver present in the autonomous vehicle manually controls (e.g., acceleration, braking, steering) the vehicle 108 via one or more vehicle control devices (e.g., steering device) of the vehicle 108. Park and/or sleep modes can be used between operational modes while the vehicle 108 performs various actions including waiting to provide a subsequent vehicle service, and/or recharging between operational modes.

An indication, record, and/or other data indicative of the state of the vehicle 108, the state of one or more passengers of the vehicle 108, and/or the state of an environment external to the vehicle 108 including one or more objects (e.g., the physical dimensions, velocity, acceleration, heading, location, and/or appearance of the one or more objects) can be stored locally in one or more memory devices of the vehicle 108. Furthermore, as discussed above, the vehicle 108 can provide data indicative of the state of the one or more objects (e.g., physical dimensions, velocity, acceleration, heading, location, and/or appearance of the one or more objects) within a predefined distance of the vehicle 108 to the operations computing system 104 and/or the remote computing devices 106, which can store an indication, record, and/or other data indicative of the state of the one or more objects within a predefined distance of the vehicle 108 in one or more memory devices associated with the operations computing system 104 and/or the one or more remote computing devices 106 (e.g., remote from the vehicle).

The vehicle 108 can include and/or be associated with the vehicle computing system 112. The vehicle computing system 112 can include one or more computing devices located onboard the vehicle 108. For example, the one or more computing devices of the vehicle computing system 112 can be located on and/or within the vehicle 108. The one or more computing devices of the vehicle computing system 112 can include various components for performing various operations and functions. For instance, the one or more computing devices of the vehicle computing system 112 can include one or more processors and one or more tangible non-transitory, computer readable media (e.g., memory devices). The one or more tangible non-transitory, computer readable media can store instructions that when executed by the one or more processors cause the vehicle 108 (e.g., its computing system, one or more processors, and other devices in the vehicle 108) to perform operations and/or functions, including those described herein for accessing state data including information associated with one or more respective locations and/or characteristics of one or more objects over a plurality of time intervals and/or determining, based at least in part on the state data and a machine-learned prediction generator model, one or more predicted trajectories of the one or more objects at one or more subsequent time intervals following the plurality of time intervals. Furthermore, the vehicle computing system 112 can perform one or more operations associated with the control, exchange of data, and/or operation of various devices and systems including robotic devices and/or other computing devices.

As depicted in FIG. 1, the vehicle computing system 112 can include the one or more sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more sensors 114 can be configured to generate and/or store data including the sensor data 116 associated with one or more objects proximate to the vehicle 108 (e.g., within range or a field of view of one or more of the one or more sensors 114). The one or more sensors 114 can include one or more Light Detection and Ranging (LiDAR) systems, one or more Radio Detection and Ranging (RADAR) systems, one or more cameras (e.g., visible spectrum cameras and/or infrared cameras), one or more sonar systems, one or more motion sensors, and/or other types of image capture devices and/or sensors. The sensor data 116 can include image data, radar data, LiDAR data, sonar data, and/or other data acquired by the one or more sensors 114. The one or more objects can include, for example, pedestrians, vehicles, bicycles, buildings, roads, foliage, utility structures, bodies of water, and/or other objects. The one or more objects can be located on or around (e.g., in the area surrounding the vehicle 108) various parts of the vehicle 108 including a front side, rear side, left side, right side, top, or bottom of the vehicle 108. The sensor data 116 can be indicative of a location of the one or more objects within the surrounding environment of the vehicle 108 at one or more times. For example, sensor data 116 can be indicative of one or more LiDAR point clouds associated with the one or more objects within the surrounding environment. The one or more sensors 114 can provide the sensor data 116 to the autonomy computing system 120.

In addition to the sensor data 116, the autonomy computing system 120 can retrieve or otherwise obtain data, including the map data 122. The map data 122 can provide detailed information about the surrounding environment of the vehicle 108. For example, the map data 122 can provide information regarding: the identity and/or location of different roadways, road segments, buildings, or other items or objects (e.g., lampposts, crosswalks and/or curbs); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 108. The positioning system 118 can be any device or circuitry for analyzing the position of the vehicle 108. For example, the positioning system 118 can determine a position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 108 can be used by various systems of the vehicle computing system 112 and/or provided to one or more remote computing devices (e.g., the operations computing system 104 and/or the remote computing devices 106). For example, the map data 122 can provide the vehicle 108 relative positions of the surrounding environment of the vehicle 108. The vehicle 108 can identify its position within the surrounding environment (e.g., across six axes) based at least in part on the data described herein. For example, the vehicle 108 can process the sensor data 116 (e.g., LiDAR data, camera data) to match it to a map of the surrounding environment to get a determination of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 108 and determine a motion plan for controlling the motion of the vehicle 108 accordingly. For example, the autonomy computing system 120 can receive the sensor data 116 from the one or more sensors 114, attempt to determine the state of the surrounding environment by performing various processing techniques on the sensor data 116 (and/or other data), and generate an appropriate motion plan through the surrounding environment, including for example, a motion plan that navigates the vehicle 108 around the current and/or predicted locations of one or more objects detected by the one or more sensors 114. The autonomy computing system 120 can control the one or more vehicle control systems 138 to operate the vehicle 108 according to the motion plan.

The autonomy computing system 120 can identify one or more objects that are proximate to the vehicle 108 based at least in part on the sensor data 116 and/or the map data 122. For example, the perception system 124 can obtain state data 130 descriptive of a current and/or past state of an object that is proximate to the vehicle 108. The state data 130 for each object can describe, for example, an estimate of the object's current and/or past: location and/or position; speed; velocity; acceleration; heading; orientation; size/footprint (e.g., as represented by a bounding shape); class (e.g., pedestrian class vs. vehicle class vs. bicycle class), and/or other state information. The perception system 124 can provide the state data 130 to the prediction system 126 (e.g., for predicting the movement of an object).

The prediction system 126 can generate prediction data 132 associated with each of the respective one or more objects proximate to the vehicle 108. The prediction data 132 can be indicative of one or more predicted future locations of each respective object. The prediction data 132 can be indicative of a predicted path (e.g., predicted trajectory) of at least one object within the surrounding environment of the vehicle 108. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128.

In some implementations, the prediction system 126 can utilize one or more machine-learned models. For example, the prediction system 126 can determine prediction data 132 including a predicted trajectory (e.g., a predicted path, one or more predicted future locations, etc.) along which a respective object is predicted to travel over time based on one or more machine-learned models. By way of example, the prediction system 126 can generate such predictions by including, employing, and/or otherwise leveraging a machine-learned prediction model. For example, the prediction system 126 can receive state data 130 (e.g., from the perception system 124) associated with one or more objects within the surrounding environment of the vehicle 108. The prediction system 126 can input the state data 130 (e.g., BEV image, LIDAR data, etc.) into the machine-learned prediction model to determine trajectories of the one or more objects based on the state data 130 associated with each object. For example, the machine-learned prediction model can be previously trained to output a future trajectory (e.g., a future path, one or more future geographic locations, etc.) of an object within a surrounding environment of the vehicle 108. In this manner, the prediction system 126 can determine the future trajectory of the object within the surrounding environment of the vehicle 108 based, at least in part, on the machine-learned prediction generator model.

As discussed above, the machine-learned prediction model can be previously trained via one or more machine-learning techniques. In some implementations, the machine-learned prediction model can be previously trained by one or more devices (e.g., training computing system, operations computing system 104, one or more remote computing devices 106, etc.) remote from the vehicle 108.

The motion planning system 128 can determine a motion plan and generate motion plan data 134 for the vehicle 108 based at least in part on the prediction data 132 (and/or other data). The motion plan data 134 can include vehicle actions with respect to the objects proximate to the vehicle 108 as well as the predicted movements. For instance, the motion planning system 128 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 108 can perform a certain action (e.g., pass an object) without increasing the potential risk to the vehicle 108 and/or violating any traffic laws (e.g., speed limits, lane boundaries, signage). The motion plan data 134 can include a planned trajectory, velocity, acceleration, and/or other actions of the vehicle 108.

The motion planning system 128 can provide the motion plan data 134 with data indicative of the vehicle actions, a planned trajectory, and/or other operating parameters to the vehicle control systems 138 to implement the motion plan data 134 for the vehicle 108. For instance, the vehicle 108 can include a mobility controller configured to translate the motion plan data 134 into instructions. In some implementations, the mobility controller can translate determined motion plan data 134 into instructions for controlling the vehicle 108 including adjusting the steering of the vehicle 108 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections). In some implementations, the communications system 136 can allow communication among one or more of the system on-board the vehicle 108. The communications system 136 can also be configured to enable the autonomous vehicle to communicate with and/or provide and/or receive data and/or signals from a remote computing device 106 associated with a user and/or an item (e.g., an item to be picked-up for a courier service). The communications system 136 can utilize various communication technologies including, for example, radio frequency signaling and/or Bluetooth low energy protocol. The communications system 136 can include any suitable components for interfacing with one or more networks, including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop and/or smartphone) can be viewable by a user of the vehicle 108 that is located in the front of the vehicle 108 (e.g., driver's seat, front passenger seat). Additionally, or alternatively, a display device can be viewable by a user of the vehicle 108 that is located in the rear of the vehicle 108 (e.g., a back passenger seat). For example, the autonomy computing system 120 can provide one or more outputs including a graphical display of the location of the vehicle 108 on a map of a geographical area within one kilometer of the vehicle 108 including the locations of objects around the vehicle 108. A passenger of the vehicle 108 can interact with the one or more human-machine interfaces 140 by touching a touch-screen display device associated with the one or more human-machine interfaces.

In some implementations, the vehicle computing system 112 can perform one or more operations including activating, based at least in part on one or more signals or data (e.g., the sensor data 116, the map data 122, the state data 130, the prediction data 132, and/or the motion plan data 134) one or more vehicle systems associated with operation of the vehicle 108. For example, the vehicle computing system 112 can send one or more control signals to activate one or more vehicle systems that can be used to control and/or direct the travel path of the vehicle 108 through an environment.

By way of further example, the vehicle computing system 112 can activate one or more vehicle systems including: the communications system 136 that can send and/or receive signals and/or data with other vehicle systems, other vehicles, or remote computing devices (e.g., remote server devices); one or more lighting systems (e.g., one or more headlights, hazard lights, and/or vehicle compartment lights); one or more vehicle safety systems (e.g., one or more seatbelt and/or airbag systems); one or more notification systems that can generate one or more notifications for passengers of the vehicle 108 (e.g., auditory and/or visual messages about the state or predicted state of objects external to the vehicle 108); braking systems; propulsion systems that can be used to change the acceleration and/or velocity of the vehicle which can include one or more vehicle motor or engine systems (e.g., an engine and/or motor used by the vehicle 108 for locomotion); and/or steering systems that can change the path, course, and/or direction of travel of the vehicle 108.

Figure 2:
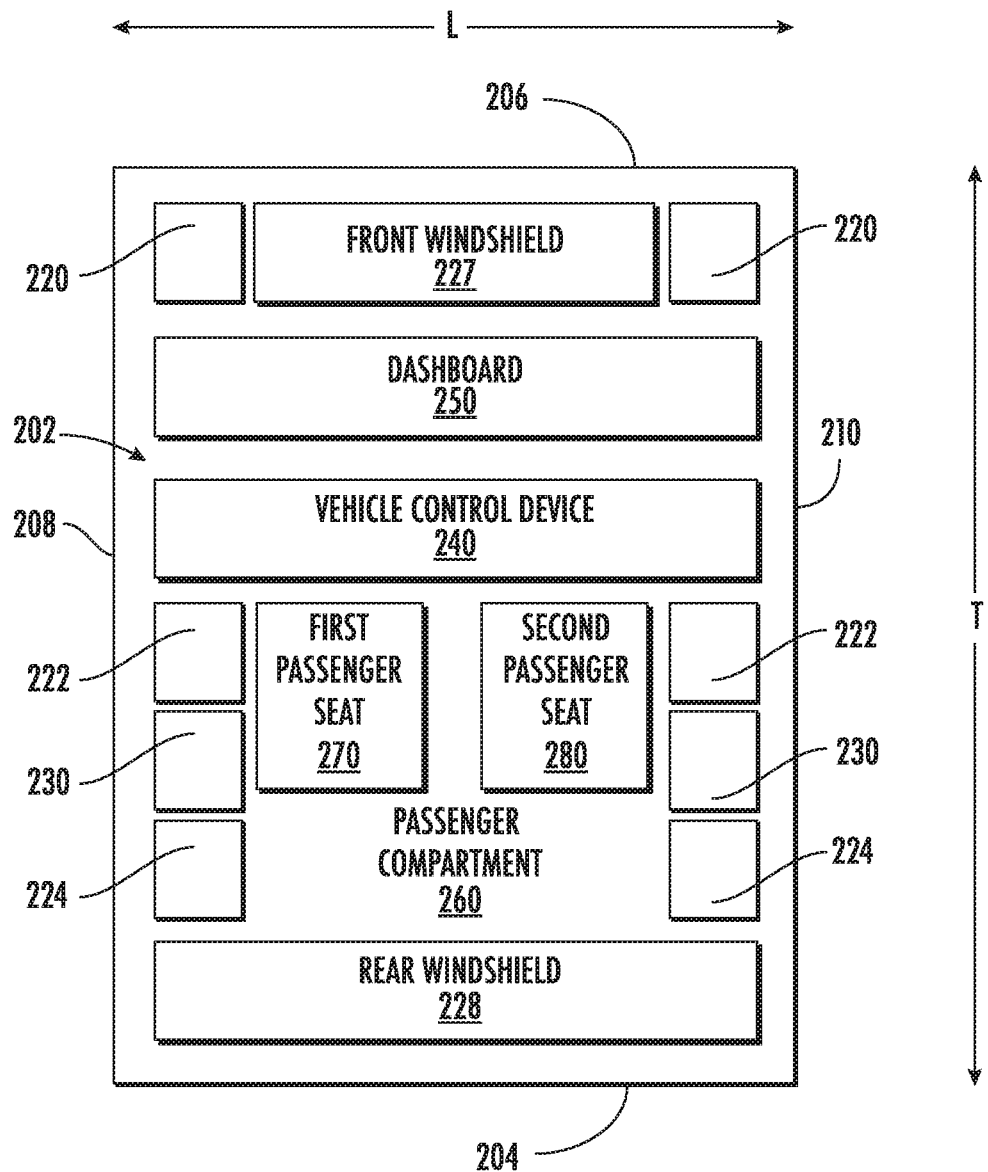
FIG. 2 depicts a block diagram of components of an autonomous vehicle according to example embodiments of the present disclosure.

Referring now to FIG. 2, a block diagram of components of an autonomous vehicle 200, such as the vehicle 108 discussed above with reference to FIG. 1, are provided according to example embodiments of the present disclosure. The autonomous vehicle 200 defines a lateral direction L, a longitudinal direction T, and a vertical direction V (FIGS. 7-12). As shown, an interior 202 of the autonomous vehicle 200 extends along the longitudinal direction T between a first or rear end 204 of the autonomous vehicle 200 and a second or forward end 206 of the autonomous vehicle 200. The interior 202 of the autonomous vehicle 200 also extends along the lateral direction L between a first side 208 of the autonomous vehicle 200 and a second side 210 of the autonomous vehicle 200.

In some implementations, the autonomous vehicle 200 can include a first pillar 220 (e.g., A-pillar), a second pillar 222 (e.g., B-pillar), and a third pillar 224 (e.g., C-pillar). As shown, the first pillar 220, the second pillar 222, and the third pillar 224 can be spaced apart from one another along the longitudinal direction T such that the second pillar 222 is positioned between the first pillar 220 and the third pillar 224. The first pillar 220 can be positioned proximate (e.g., closer to the forward end 206 than the rear end 204) the forward end 206 of the autonomous vehicle 200. In this manner, the first pillar 220 can frame, at least in part, an opening for a first or front windshield 227. In some implementations, the autonomous vehicle 200 can include a rear windshield 228. For instance, the rear end 204 of the autonomous vehicle 200 can define an opening for the rear windshield 228.

In some implementations, the second pillar 222 and the third pillar 226 can define, at least in part, an opening for a door 230. The door 230 can be movable between at least an open position and a closed position to selectively allow a person to access the interior 202 of the autonomous vehicle 200. As shown, the door 230 included on both the first side 208 of the autonomous vehicle 200 and the second side 210 of the autonomous vehicle 200. In alternative implementations, the door 230 may be provided on only one side (e.g., first side 208 or second side 210) of the autonomous vehicle 200.

The autonomous vehicle 200 can include means for manually controlling the autonomous vehicle 200. The means can include, for example, a vehicle control device 240. The vehicle control device 240 can include a steering wheel, joystick, yoke, touchscreen, one or more buttons, pedals, throttles, and/or other types of control apparatuses that allow for human user input. As shown, the vehicle control device 240 can be positioned within the interior 202 of the autonomous vehicle 200. For instance, in some implementations, the vehicle control device 240 can be positioned proximate (e.g., closer to the forward end 206 of the autonomous vehicle 200 than the rear end 204 of the autonomous vehicle 200) to the forward end 206 of the autonomous vehicle 200. The vehicle control device 240 can be used by a passenger to manually control operation (e.g., steering, braking, accelerating, etc.) of the autonomous vehicle 200 when the autonomous vehicle 200 is configured in the semi-autonomous operating mode or the manual operating mode.

In some implementations, the vehicle control device 240 can be associated with a dashboard 250 positioned within the interior 202 of the autonomous vehicle 200. For instance, the vehicle control device 240 can be a steering device (e.g., steering wheel, joystick, etc.) that can be used by a passenger to manually control (e.g., steer) the autonomous vehicle 200. In some implementations, the steering device can include one or more input devices (e.g., paddle shifters, etc.) configured to receive user-input associated with accelerating or braking the autonomous vehicle 200. In this manner, the passenger can provide user-input associated with accelerating or braking the autonomous vehicle 200 via the one or more input devices.

As shown, the interior 202 of an autonomous vehicle 200 can include a passenger compartment 260. The passenger compartment 260 can be accessible via the door 230 of the autonomous vehicle 200. Furthermore, the passenger compartment 260 can include means (e.g., seats, benches, stools, other supports, etc.) to accommodate one or more passengers. For example, the passenger compartment 260 can accommodate at least a first passenger seat 270 and a second passenger seat 280. In some implementations, the first passenger seat 270 and the second passenger seat 280 can be arranged in a side-by-side configuration to form a row of seats that separates the vehicle control device 240 from the passenger compartment. In such implementations, the first passenger seat 270 and the second passenger seat 280 are positioned such that a seating orientation of both the first passenger seat 270 and the second passenger seat 280 is directed towards the rear end 204 of the autonomous vehicle 200. Accordingly, a passenger seated in the first passenger seat 270 or the second passenger seat 280 faces away from the vehicle control device 240. In this manner, the passenger cannot manually control the autonomous vehicle 200 via the vehicle control device 240 when the seating orientation of both the first passenger seat 270 and the second passenger seat 280 face the rear end 204 of the autonomous vehicle 200.

Figure 3:
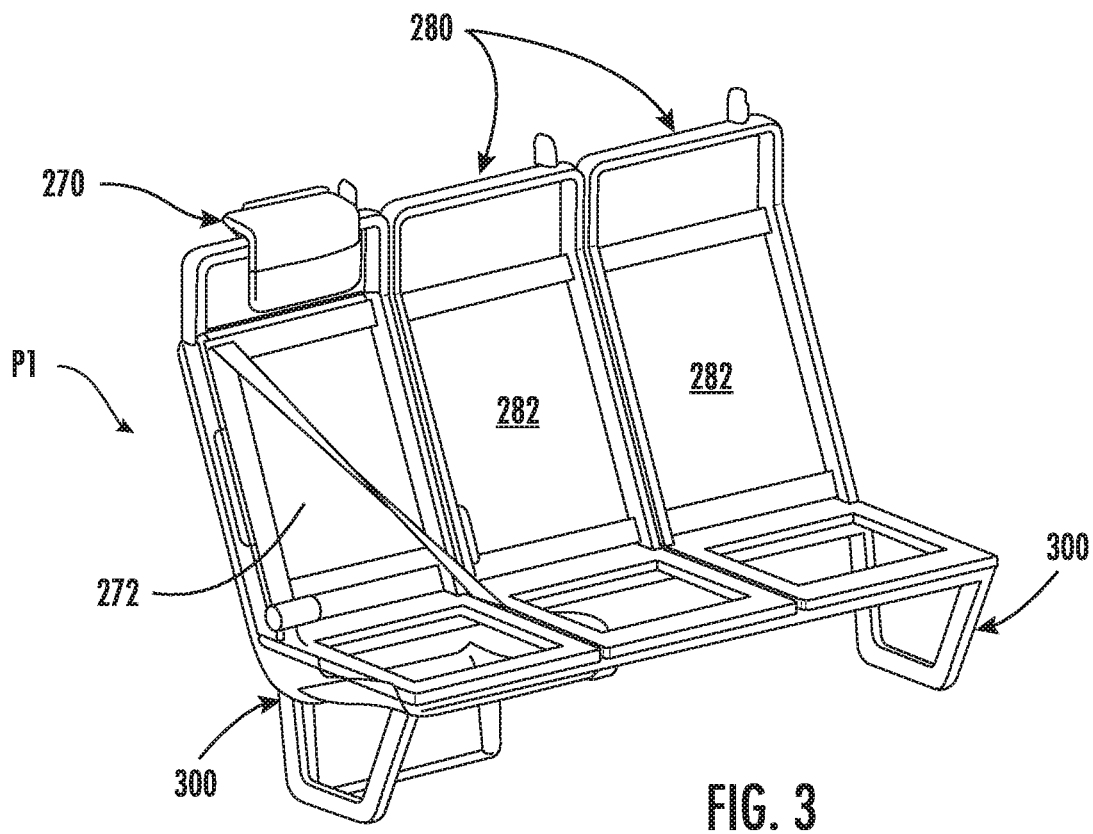
FIG. 3 depicts a first passenger seat and a second passenger seat in a first position according to example embodiments of the present disclosure.
Figure 4:
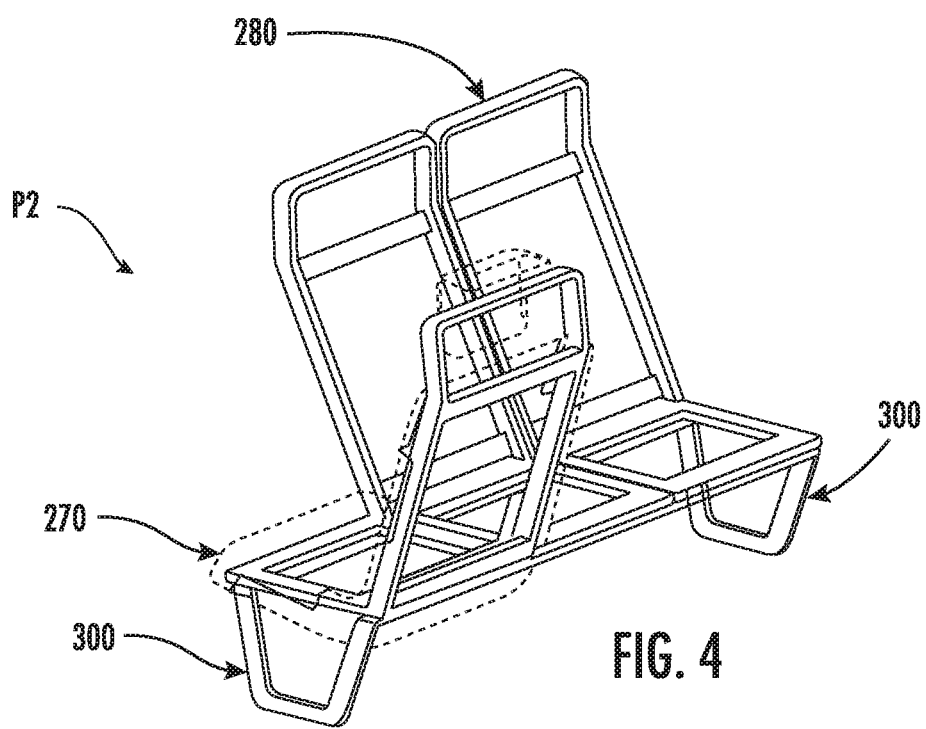
FIG. 4 depicts the first passenger seat in a second position according to example embodiments of the present disclosure.

Referring now to FIGS. 3 and 4, the first passenger seat 270 and the second passenger seat 280 can each be mounted to means for supporting the seats. This can include, for example, a frame 300. The frame 300 can be made of metal, plastic, composite, wood, and/or any other suitable support material. The frame 300 can be secured to a floorboard (not shown) of the autonomous vehicle 200. In this manner, the first passenger seat 270 and the second passenger seat 280 can be secured to the floorboard via the frame 300. In some implementations, the autonomous vehicle 200 can include separate frames (e.g., first frame, second frame) for the first passenger seat 270 and the second passenger seat 280. For instance, the first passenger seat 270 can be mounted to a first frame, whereas the second passenger seat 280 can be mounted to a second frame that is different than the first frame. As will be discussed below, the seating orientation of the first passenger seat 270 can be adjusted to allow a passenger to manually control the autonomous vehicle 200 using the vehicle control device 240. It should be understood that a seat can be mounted to the frame 300 via a latch, clip, snapping mechanism, magnet, velcro, and/or other suitable means for at least temporarily mounting a seat to the frame 300.

The first passenger seat 270 is configurable in at least a first position P1 (FIG. 3) and a second position P2 (FIG. 4) to selectively allow a passenger to manually control the autonomous vehicle 200 via the vehicle control device 240. More specifically, the first passenger seat 270 is movable between at least the first position P1 and the second position P2. When the first passenger seat 270 is in the first position P1, the seating orientation of the first passenger seat faces the rear end 204 (FIG. 2) of the autonomous vehicle 200 such that a passenger seated in the first passenger seat 270 faces away from the vehicle control device 240 (FIG. 2). In this manner, the passenger cannot manually control the autonomous vehicle 200 via the vehicle control device 240 when the first passenger seat 270 is in the first position.

In some implementations, the first passenger seat 270 can be removably coupled to the frame 300. In this manner, the first passenger seat 270 can be decoupled (e.g., released) from the frame 300 to allow the passenger to move the first passenger seat 270 from the first position P1 to the second position P2 or vice versa. In some implementations, the first passenger seat can be removably coupled to the frame 300 via manipulation of a means configured to lock a seat to a frame. The means can include, for example, a locking device (e.g., latch, hook, clip, magnet, key lock, combo/code lock, etc.). In such implementations, the first passenger seat 270 can be decoupled from the frame 300 via manipulation of the locking device by the passenger. When the first passenger seat is decoupled from the frame 300, the passenger can move the first passenger seat 270 from the first position P1 to the second position P2 or vice versa. Furthermore, the first passenger seat 270 can be recoupled to the frame 300 when the passenger has finished moving the first passenger seat 270. For example, in some implementations, the passenger can apply a force to the first passenger seat 270 when the first passenger seat is positioned on the frame 300 in either the first position P1 or the second position P2 to recouple the first passenger seat 270 to the frame 300 (e.g., via the locking device). This force can include, for example, the manipulation of a key, latching mechanism, button, snap, soft button, code entry interface, etc. to open a lock/latch/demagnetize to allow the seat to be decoupled and manipulating a key, latching mechanism, button, snap, soft button, code entry interface, etc. to re-lock/latch/demagnetize to allow the seat to be coupled.

Figure 5:
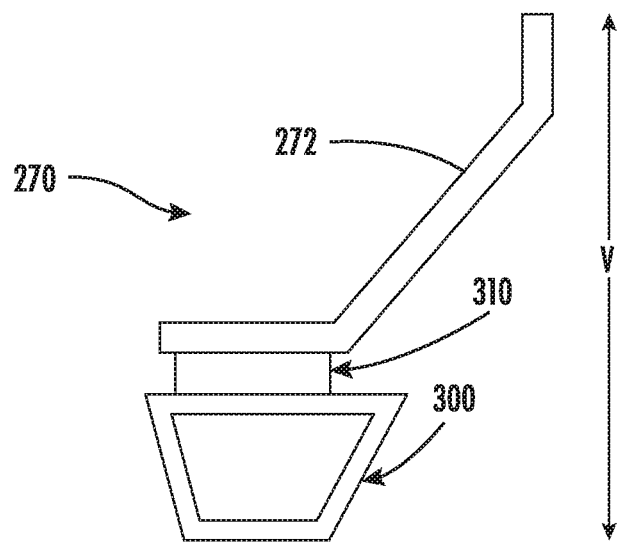
FIG. 5 depicts a passenger seat for an autonomous vehicle according to example embodiments of the present disclosure.
Figure 6:
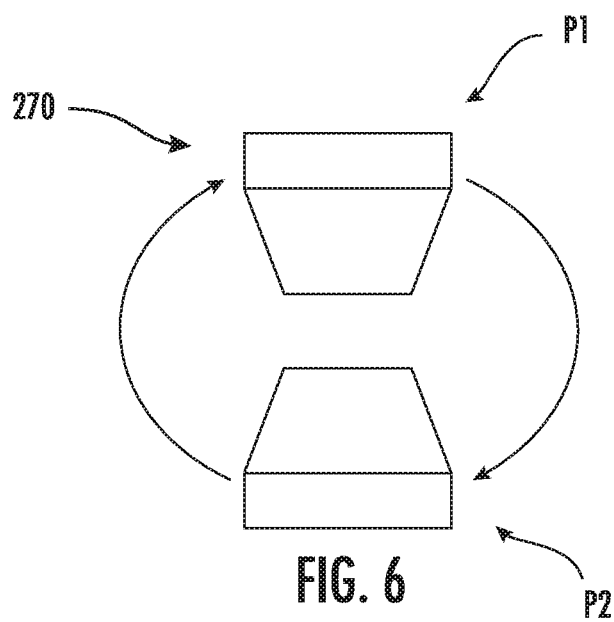
FIG. 6 depicts a top view of the passenger seat of FIG. 5 to illustrate movement of the passenger seat from the first position to the second position according to example embodiments of the present disclosure.
Figure 7:
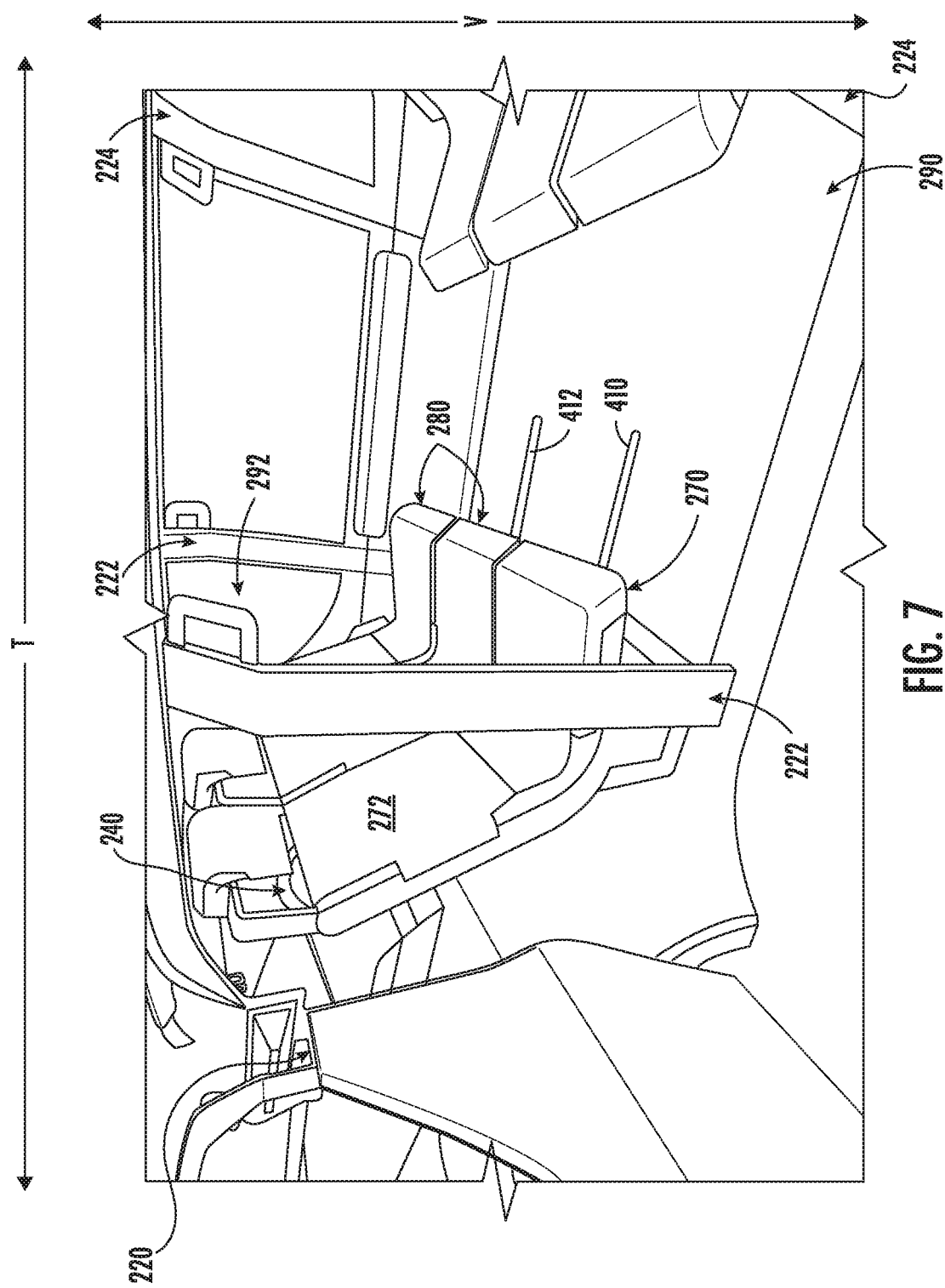
FIG. 7 depicts an interior of an autonomous vehicle having a first passenger seat in a first position according to example embodiments of the present disclosure.
Figure 8:
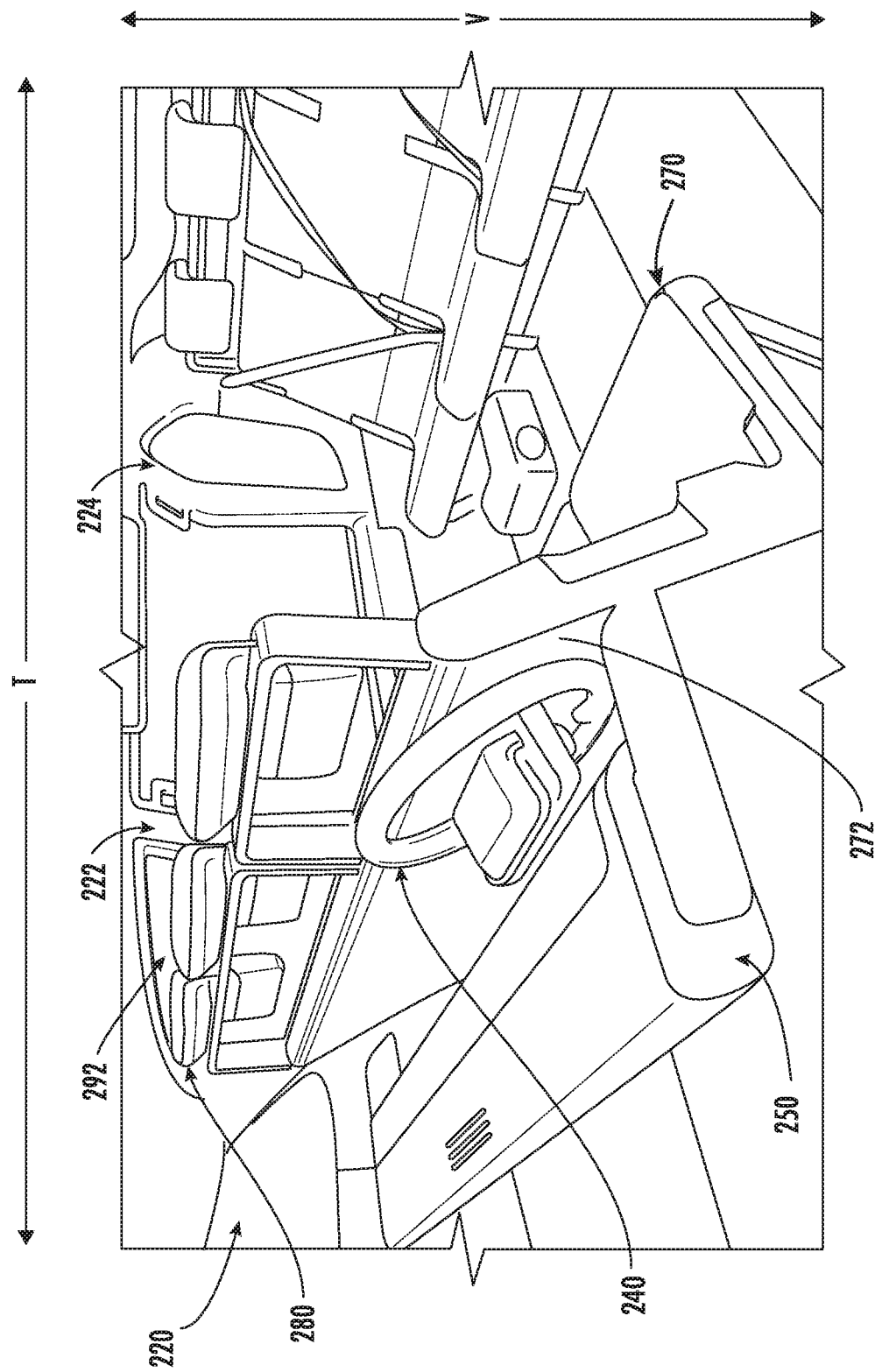
FIG. 8 depicts another view of the interior of FIG. 7 according to example embodiments of the present disclosure.
Figure 9:
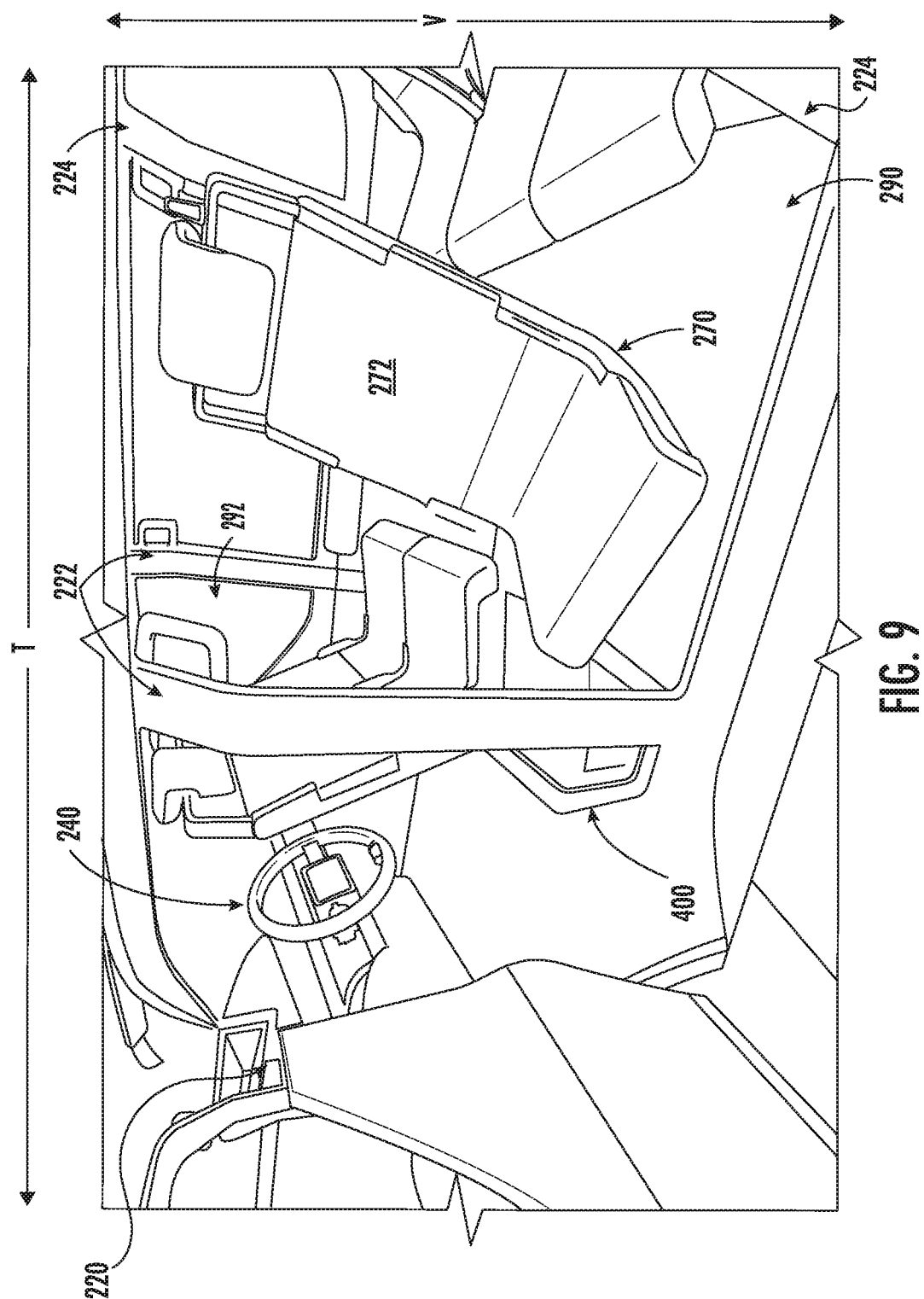
FIG. 9 depicts movement of the first passenger seat from a first position (FIGS. 7 and 8) in which the first passenger seat faces away from a vehicle control device of the autonomous vehicle according to example embodiments of the present disclosure.

Referring now to FIGS. 5 and 6, the first passenger seat 270 can, in some implementations, be rotatably coupled to the frame 300. For example, the first passenger seat 270 can be rotatably coupled to the frame 300 via rotational means. The rotational means can include, for example, a swivel 310 or any other suitable type of device that allows the first passenger seat 270 to rotate relative to the frame 300. In this manner, the first passenger seat 270 can rotate from the first position P1 to the second position P2 and vice versa while the first passenger seat 270 is secured to the frame 300. In some implementations, the autonomous vehicle 200 can include an input device configured to receive a user-input associated with rotating the first passenger seat 270 between the first position P1 and the second position P2. The input device can include, for example, a press-button, switching device, GUI elements on a display device or any other suitable type of input device configured to receive user-input associated with rotating the first passenger seat from the first position to the second position or vice versa. In such implementations, an electric motor, servo, hydraulic system, and/or other means configured to drive rotation of the first passenger seat 270 from the first position to the second position or vice versa can be activated each time the input device receives the user-input. In this manner, the electric motor, etc. can drive rotation of the first passenger seat 270 from the first position P1 to the second position P2 or vice versa.

Referring now to FIGS. 7 through 11, the seatback 272 of the first passenger seat 270 and the seatback 282 of the second passenger seat 280 can, in some implementations, be positioned along the longitudinal direction T between the first pillar 220 (e.g., A-pillar) and the second pillar 222 (e.g., B-pillar) of the autonomous vehicle 200 (FIG. 2) when the seating orientation of the first passenger seat 270 and the second passenger seat 280 each face the rear end 204 (FIG. 2) of the autonomous vehicle 200. As will be discussed below, the seatback 272 of the first passenger seat 270 can help keep the vehicle control device 240 inaccessible and/or at least partially obscured (e.g., so that a portion is not visible) from the passenger(s) within the passenger compartment 260 (FIG. 2).

In some implementations, the seatback 272 of the first passenger seat 270 can contact (e.g., touch) the vehicle control device 240. In this manner, movement (and/or a full view) of the vehicle control device 240 can be prevented. In alternative implementations, the vehicle control device 240 can include one or more input devices (e.g., buttons, GUI elements on a display device, etc.) configured to receive user-input associated with accelerating or braking the autonomous vehicle 200. In such implementations, the seatback 272 of the first passenger seat 270 can be spaced apart from the vehicle control device 240 along the longitudinal direction L of the autonomous vehicle 200 by any suitable distance needed to prevent the seatback 272 of the first passenger seat 270 from contacting the one or more input devices of the vehicle control device 240. In this manner, inadvertent manipulation of the one or more input devices via the seatback 272 of the first passenger seat 270 can be prevented. The distance between the vehicle control device 240 and the seatback 272 of the first passenger seat 270 along the longitudinal direction T can also be small enough such that the vehicle control device 240 is still substantially obscured (e.g., at least 50% of vehicle control device 240 is blocked from view) from the view of passengers within the passenger compartment 260 of the autonomous vehicle 200. For example, the distance between the vehicle control device 240 and the seatback 272 of the first passenger seat 270 can be about four inches or less. This can help to prevent unwanted manipulation of the vehicle control device 240, while still obscuring the view of the vehicle control device 240 from the view of passengers within the passenger compartment 260. As used herein, the term "about" when used in conjunction with a numerical value refers to within 25% of the stated numerical value.

In some implementations, the first passenger seat 270 can be mounted to a first frame 400 that is movable along means configured to allow a seat to be adjusted in the longitudinal or lateral directions. The means can include a track, slider, guide, magnet, etc. For example, the first passenger seat 270 can be mounted to a first frame 400 that is movable along a first track 410 that extends along the longitudinal direction T of the autonomous vehicle 200. In this manner, the first passenger seat 270 can move along the first track 410 to adjust a position of the first passenger seat 270 along the longitudinal direction T of the autonomous vehicle 200. In some implementations, the autonomous vehicle 200 can include one or more input devices (e.g., press-button, switching device, GUI elements on a display device, etc.) configured to receive user-input associated with moving the first passenger seat 270 along the first track 410. For instance, the user-input can be associated with adjusting a distance between the first passenger seat 270 and the vehicle control device 240 when the first passenger seat 270 is in the second position P2 (FIGS. 10 and 11) to provide leg room for the passenger seated in the first passenger seat 270.

In some implementations, the second passenger seat 280 can be mounted to a second frame 402 that is movable along means configured to allow a seat to be adjusted in the longitudinal or lateral directions (as described herein) such as, for example, a second track 412 that is different than the first track 410. The second track 412 can extend along the longitudinal direction T of the autonomous vehicle 200. In this manner, the second passenger seat 280 can move along the second track 412 to adjust a position of the second passenger seat 280 along the longitudinal direction T. In some implementations, the autonomous vehicle 200 can include an input device (e.g., press-button, switching device, GUI elements on a display device, etc.) configured to receive a user-input associated with moving the second passenger seat 280 along the second track 412.

It should be understood that the first track 410 and the second track 412 can be defined by a floorboard 290 of the autonomous vehicle 200. As shown, the first track 410 and the second track 412 can be spaced apart from one another along the lateral direction L. In some implementations, a length of the first track 410 can be different (e.g., shorter, longer) than a length of the second track 412. In alternative implementations, the length of the first track 410 can be the same as the length of the second track 412.

In some implementations, the second passenger seat 280 can move along the second track 412 prior to the first passenger seat 270 rotating from the first position P1 (FIGS. 7 and 8) to the second position P2 (FIGS. 10 and 11) or vice versa. For instance, the second passenger seat 280 can move along the second track 412 until the second passenger seat 280 is spaced apart from the first passenger seat 270 along the longitudinal direction T of the autonomous vehicle 200 by a distance needed to allow the first passenger seat 270 to rotate from the first position P1 to the second position P2 without contacting (e.g., touching) the second passenger seat 280. For instance, the second passenger seat 280 can move along the second track 412 until the seatback 282 of the second passenger seat 280 is positioned along the longitudinal direction T between the second pillar 222 (e.g., B-pillar) and the third pillar 224 (e.g., C-pillar) of the autonomous vehicle 200. In this manner, the seatback 282 of the second passenger seat 280 can be spaced apart from the seatback 272 of the first passenger seat 270 along the longitudinal direction T by a distance needed to allow the first passenger seat 270 to rotate from the first position P1 (FIGS. 7 and 8) to the second position P2 (FIGS. 10 and 11) without contacting the second passenger seat 280.

Figure 10:
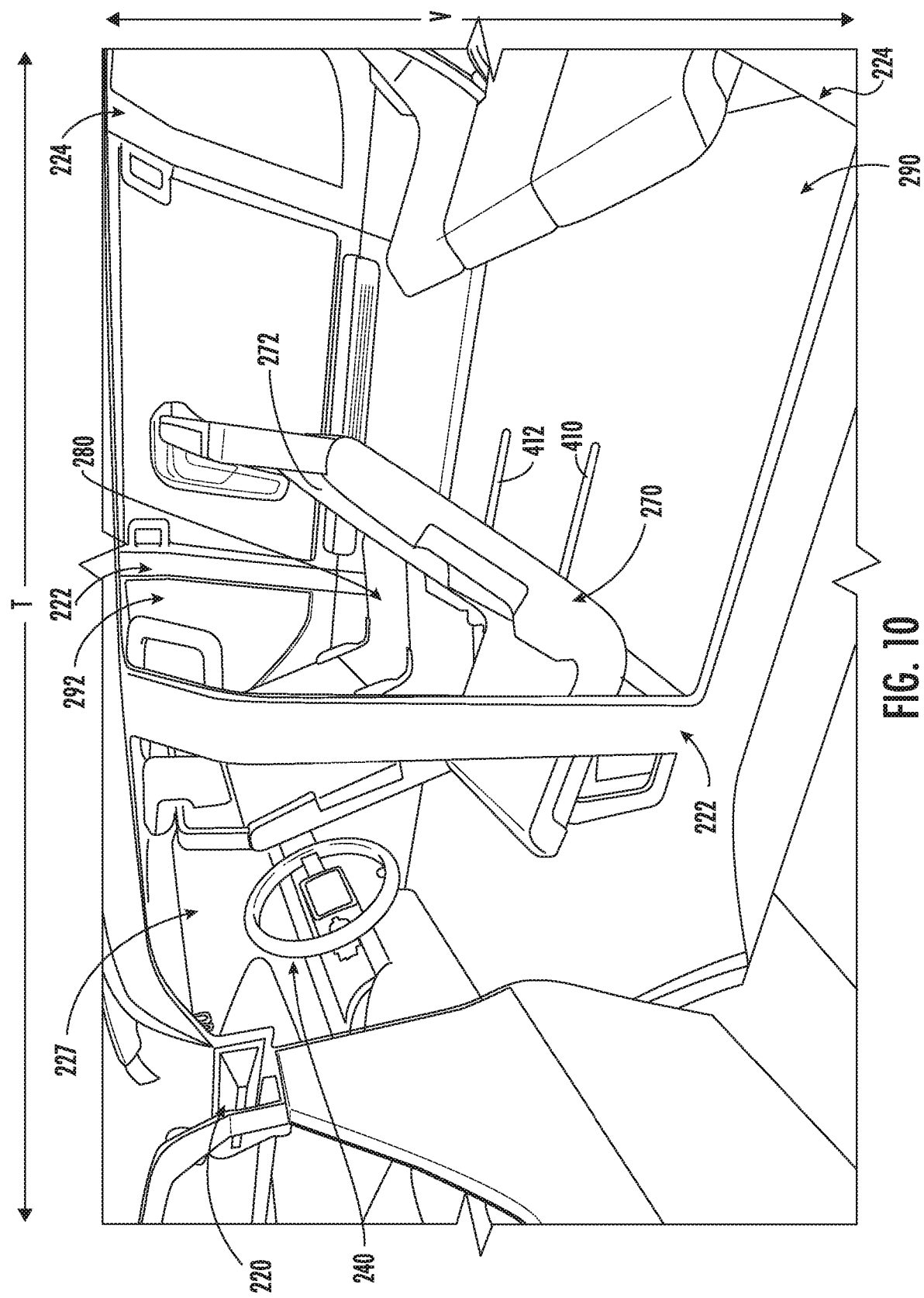
FIG. 10 depicts the first passenger seat in a second position in which the first passenger seat faces the vehicle control device of the autonomous vehicle according to example embodiments of the present disclosure.
Figure 11:
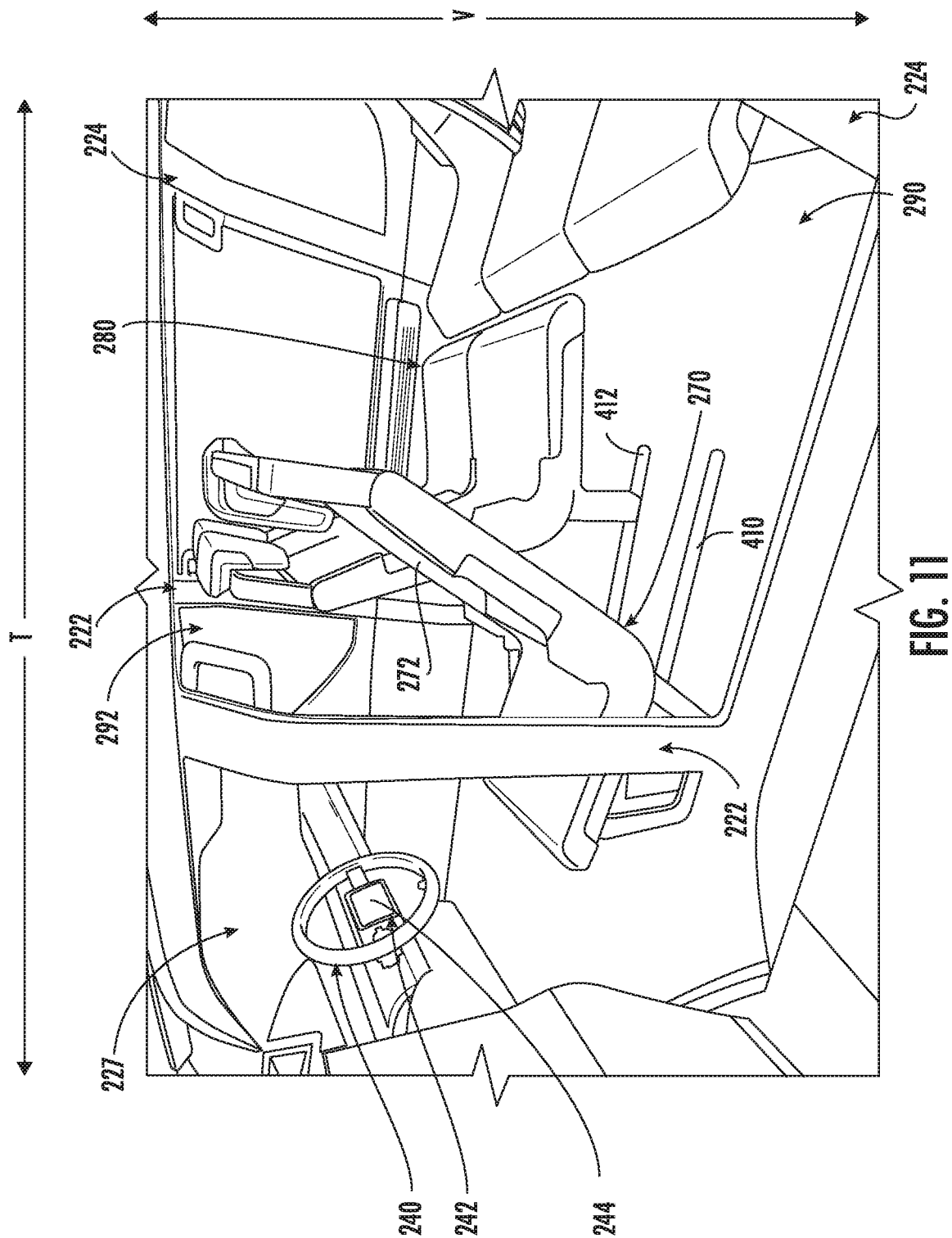
FIG. 11 depicts movement of a second passenger along a longitudinal direction of the autonomous vehicle according to example embodiments of the present disclosure.

In some implementations, the second passenger seat 280 can be positioned along the lateral direction L between the first passenger seat 270 and a passenger side window 292 of the autonomous vehicle 200 In such implementations, the second passenger seat 280 can move along the second track 412 until the second passenger seat 280 no longer obstructs the passenger's view out the passenger side window 292 when the passenger is seated in the first passenger seat 270 and the first passenger seat 270 is in the second position P2 (FIGS. 10 and 11). For instance, the second passenger seat 280 can move along the second track 412 until the seatback 282 of the second passenger seat 280 is positioned along the longitudinal direction T between the second pillar 222 of the autonomous vehicle 200 and the third pillar 226 of the autonomous vehicle 200. In this manner, the passenger seated in the first passenger seat 270 can see out the passenger side window 292 while the passenger is manually controlling the autonomous vehicle 200 via the vehicle control device 240.

In some implementations, the vehicle control device 240 can include means for displaying information for a user. The means can include a display device 242 (e.g., monitor, etc.) having a display screen 244. The display screen 244 can be configured to display one or more notifications indicative of operation of the autonomous vehicle. For instance, in some implementations, the display screen 244 can display a notification to prompt the user to provide user-input associated with moving the second passenger seat along the second track 412 such that the second passenger seat 280 does not obstruct the passenger's view out the passenger side window 292 of the autonomous vehicle 200 when seated in the first passenger seat 270 and manually controlling the autonomous vehicle 200 via the vehicle control device 240.

Figure 12:
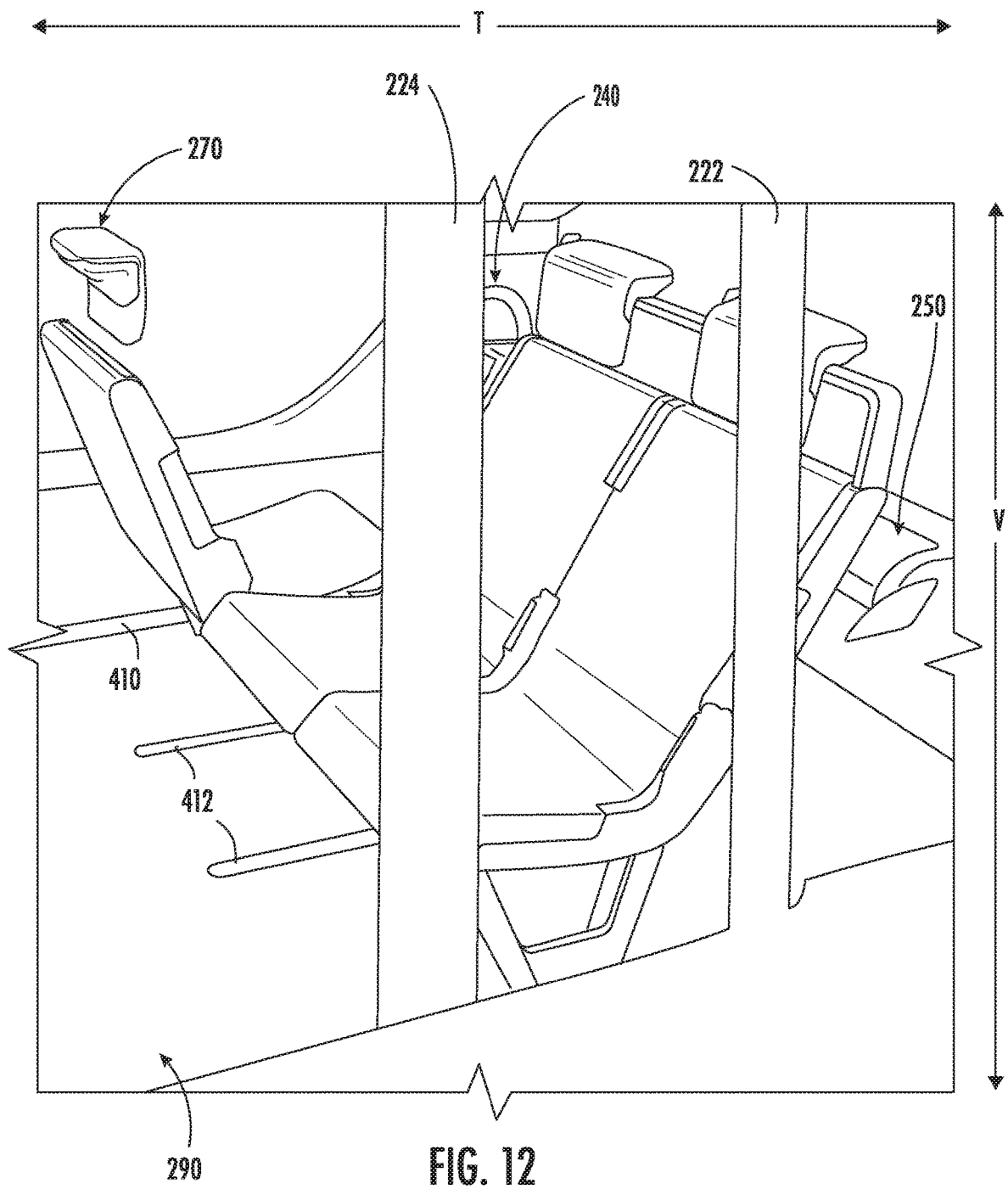
FIG. 12 depicts an embodiment in which the first passenger seat and the second passenger are oriented to face opposite directions according to example embodiments of the present disclosure.

Referring now to FIG. 12, the second pillar 222 (e.g., B-pillar) and the third pillar (e.g., C-pillar) can, in some implementations, be positioned closer to the forward end 206 of the autonomous vehicle 200. More specifically, the second pillar 222 and the third pillar 224 can each be moved along the longitudinal direction T towards the forward end 206 of the autonomous vehicle 200 such that the spacing between each of the pillars (e.g., first pillar 220, second pillar 222, third pillar 224) is reduced. It should be appreciated, however, that the pillars 220, 222, 224 can be positioned along the longitudinal direction T to have any suitable spacing therebetween.

Figure 13:
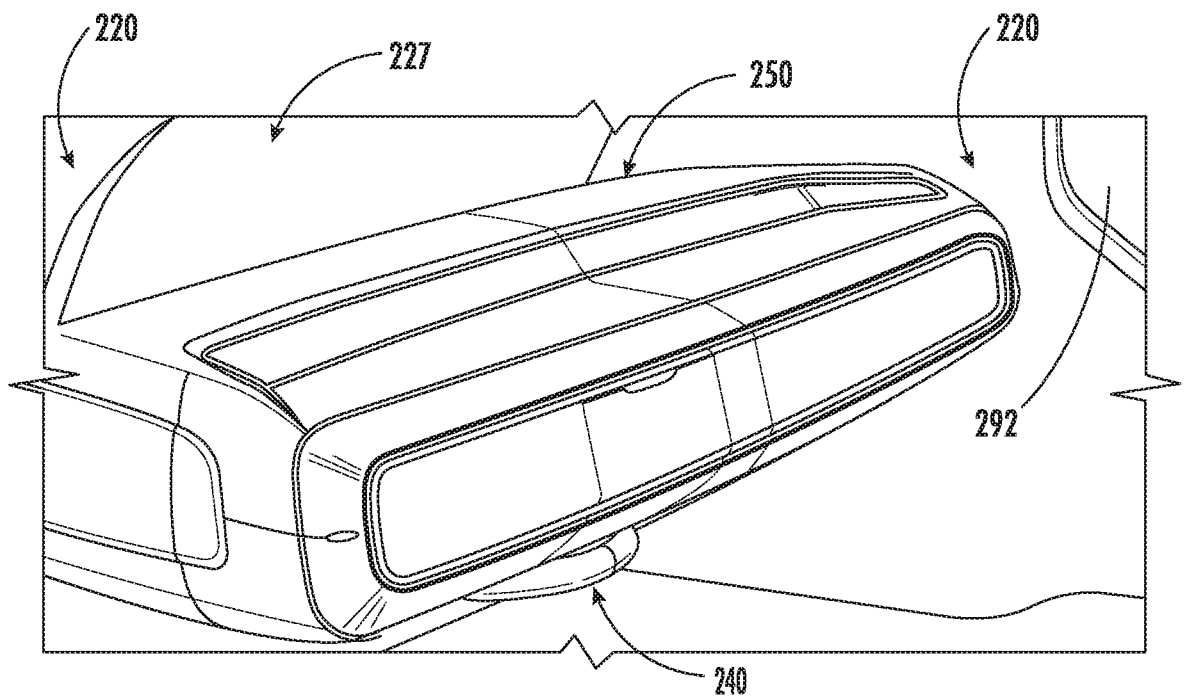
FIG. 13 depicts a vehicle control device of an autonomous vehicle in a stowed position according to example embodiments of the present disclosure.
Figure 14:
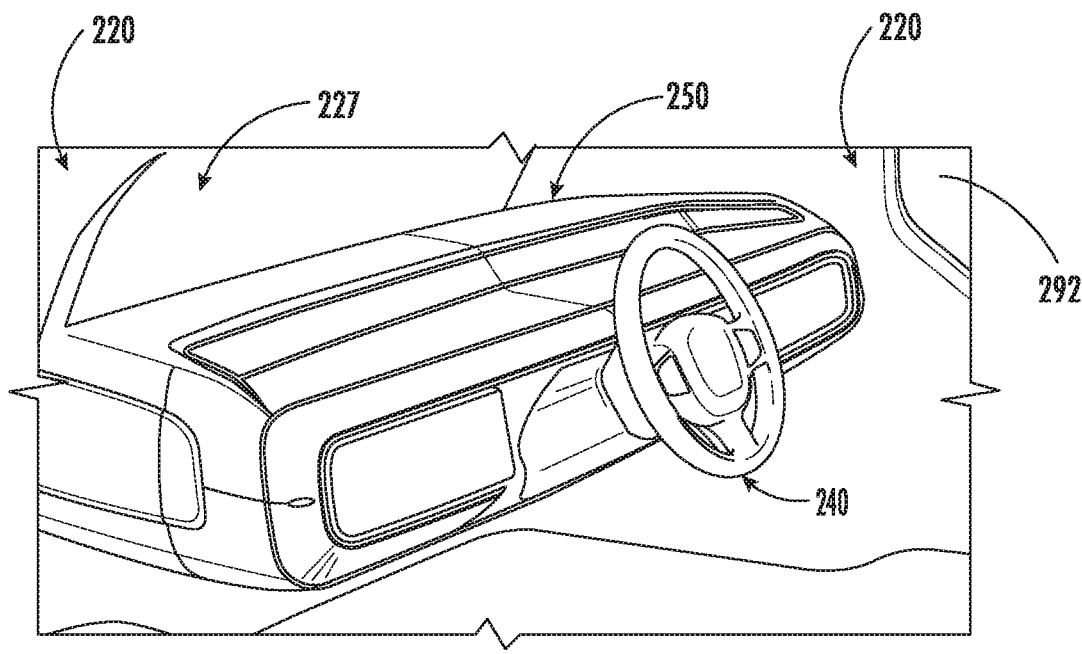
FIG. 14 depicts a vehicle control device of an autonomous vehicle in a deployed position according to example embodiments of the present disclosure.
Figure 15:
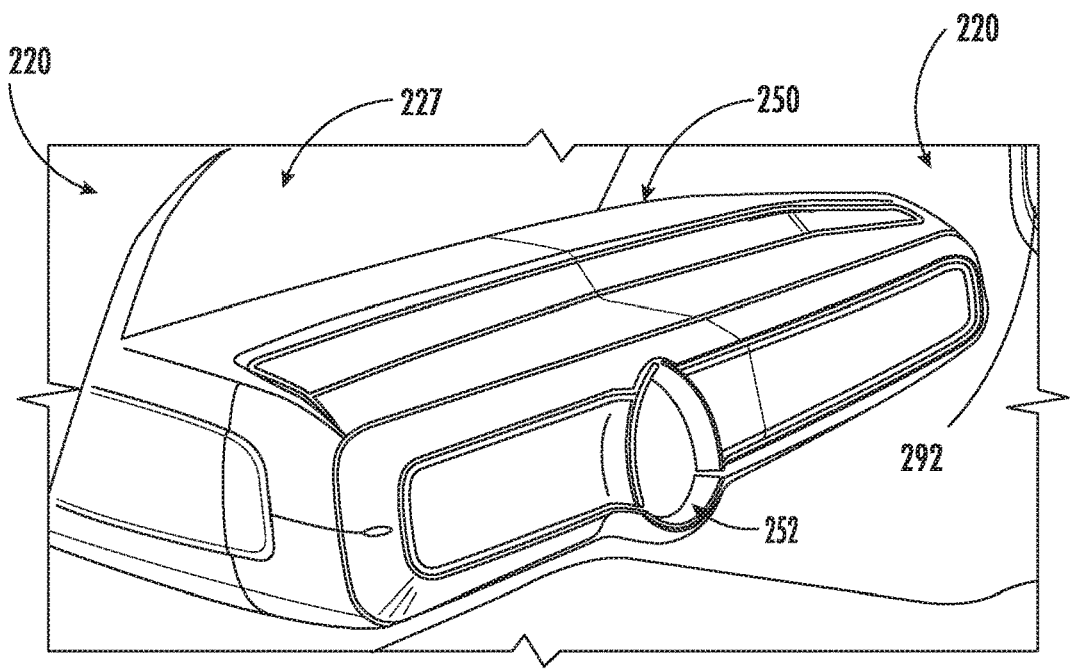
FIG. 15 depicts a dashboard of an autonomous vehicle according to example embodiments of the present disclosure.
Figure 16:
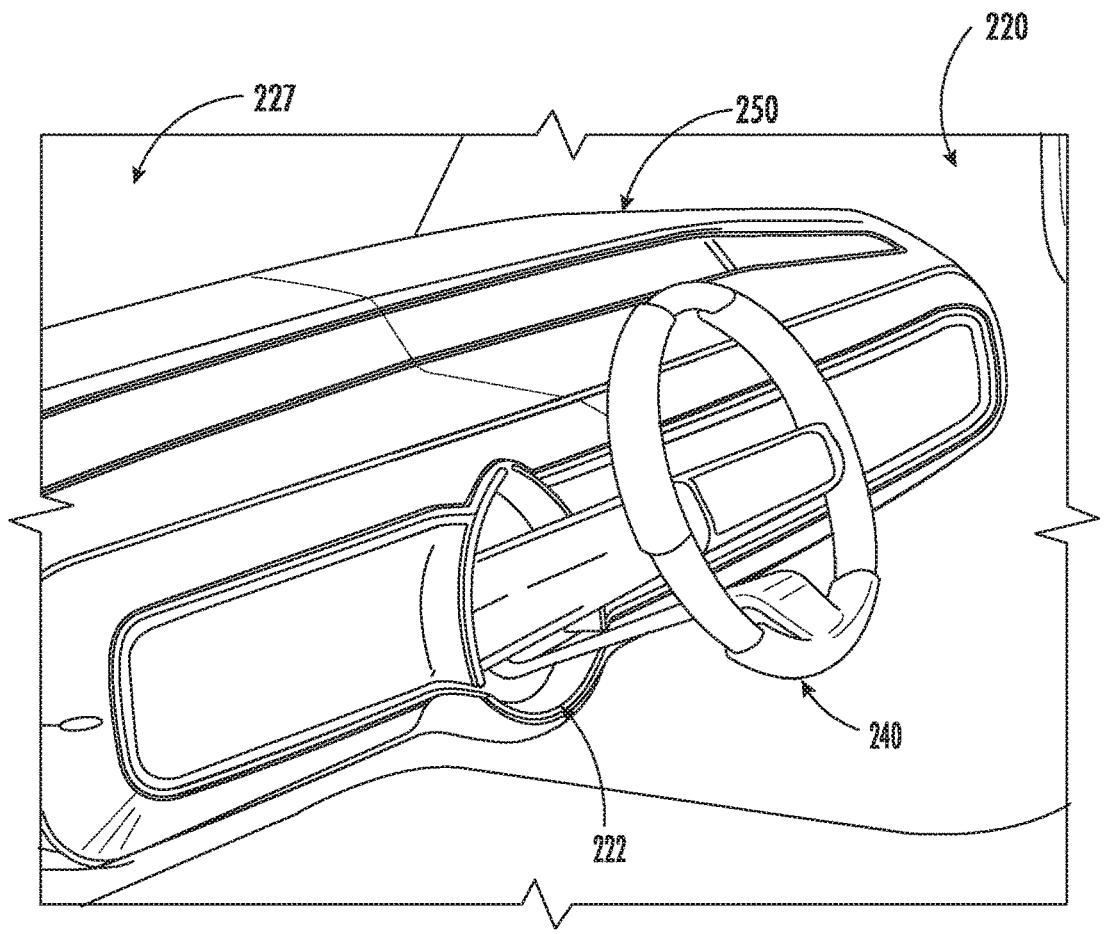
FIG. 16 depicts a vehicle control device in a deployed position according to example embodiments of the present disclosure.
Figure 17:
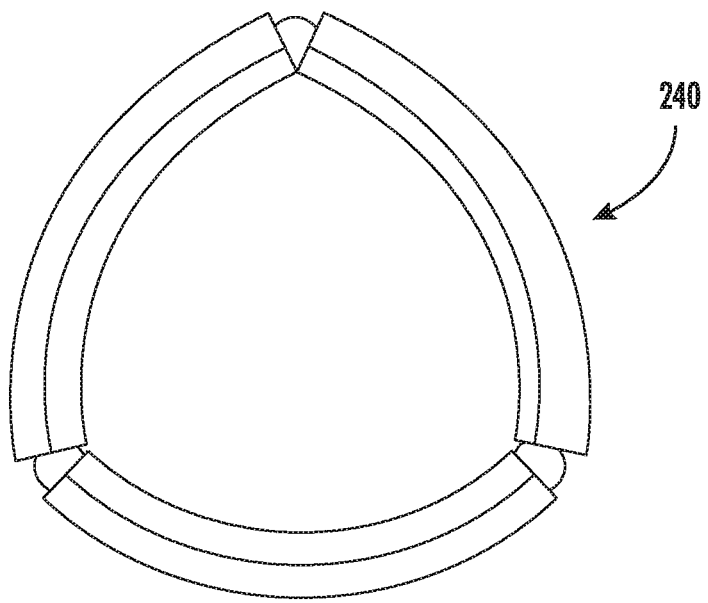
FIG. 17 depicts a vehicle control device having a first shape when the vehicle control device is in a stowed position according to example embodiments of the present disclosure.
Figure 18:
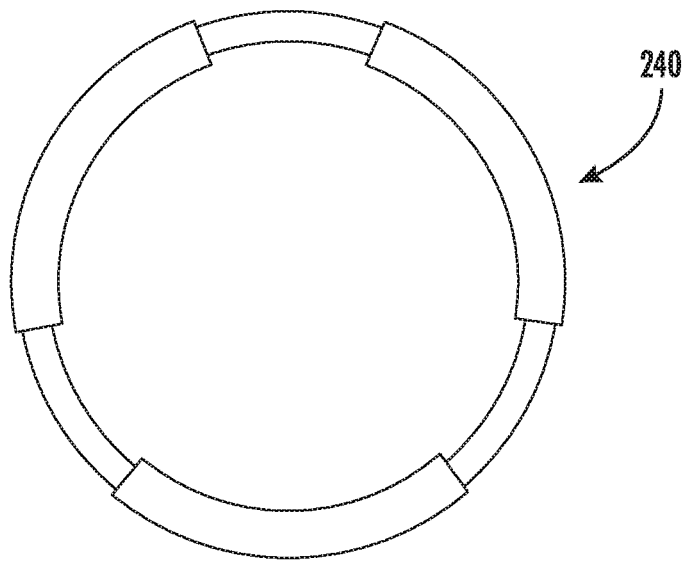
FIG. 18 depicts a vehicle control device having a second shape when the vehicle control device is in a deployed position according to example embodiments of the present disclosure.

Referring now to FIGS. 13 and 14, the vehicle control device 240 can, in some implementations, be movable between a stowed position (FIG. 13) and a deployed position (FIG. 14) based on a position (e.g., first position P1 or second position P2) of the first passenger seat 270 (FIGS. 3 and 4). When the first passenger seat 270 is in the first position P1 such that the seating orientation of the first passenger seat 270 faces away from the vehicle control device 240, the vehicle control device 240 can be in the stowed position (FIG. 13). As shown, the vehicle control device 240 can, in some implementations, be folded into a compartment defined by the dashboard 250 of the autonomous vehicle 200. Furthermore, the seatback 272 (FIGS. 3 and 4) of the first passenger seat 270 (FIGS. 3 and 4) can obscure the vehicle control device 240 from the view of passengers within the passenger compartment 260. Still further, in some implementations, the seatback 272 of the first passenger seat 270 can contact the dashboard 250 to prevent a passenger from attempting to manually move the vehicle control device 240 from the stowed position to the deployed position while the first passenger seat 270 is in the first position P1.

When the first passenger seat 270 is in the second position P2 such that the seating orientation of the first passenger seat 270 faces the vehicle control device 240, the vehicle control device 240 can be in the deployed position (FIG. 14). In this manner, the passenger seated in the first passenger seat 270 can manually control the autonomous vehicle 200 via the vehicle control device 240 when the first passenger seat 270 is in the second position P2.

Referring now to FIGS. 15-18, the dashboard 250 can, in some implementations, define an opening 252 that the vehicle control device 240 can pass through when moving between a stowed position (FIG. 15) in which the vehicle control device 240 is disposed entirely within an interior of the dashboard 250 and a deployed position (FIG. 16) in which the vehicle control device 240 is positioned at least partially outside the interior of the dashboard 250. The vehicle control device 240 can move from the stowed position to the deployed position and vice versa based, at least in part, on the position (e.g., first position or second position) of the first passenger seat 270.

When the first passenger seat 270 is in the first position P1 such that the seating orientation of the first passenger seat faces away from the dashboard 250, the vehicle control device 240 can be in the stowed position. In this manner, the vehicle control device 240 can be completely hidden from view of passengers within the passenger compartment 260 (FIG. 2) of the autonomous vehicle 200. However, when the first passenger seat 270 moves form the first position P1 to the second position P2 such that the seating orientation of the first passenger seat 270 faces the dashboard 250, the vehicle control device 240 moves from the stowed position the deployed position such that the vehicle control device 240 is accessible to passengers within the passenger compartment 260.

As shown, the vehicle control device 240 can have a first shape (FIG. 17) when the vehicle control device 240 is in the stowed position and a second shape (FIG. 18) that is different than the first shape when the vehicle control device 240 is in the deployed position. For instance, the first shape can correspond to a shape of the opening 252 the vehicle control device 240 passes through when moving from the stowed position to the deployed position and vice versa. As shown, the first shape can be substantially triangular, whereas the second shape can be substantially circular. It should be understood that the opening 252 defined by the dashboard 250 can have any suitable shape.

Figure 19:
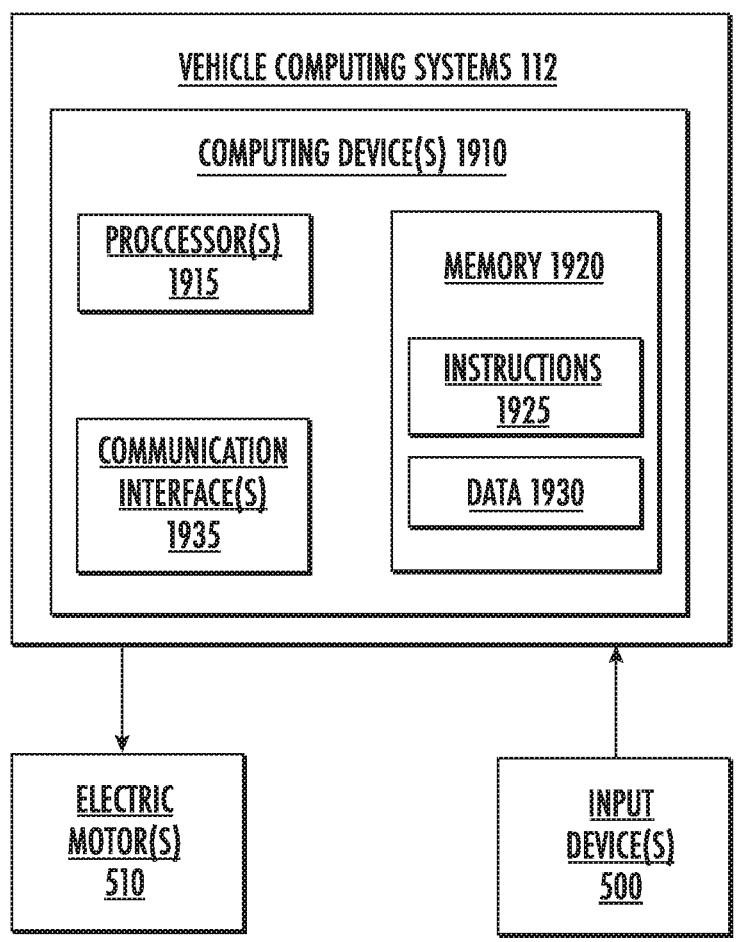
FIG. 19 depicts a system for controlling movement of a passenger seat of an autonomous vehicle according to example embodiments of the present disclosure.

Referring now to FIG. 19, the vehicle computing system 112 can be in communication with one or more input device 500 onboard the autonomous vehicle 200. In particular, the one or more input device 500 can include any input device that can be used by a passenger to submit a user-request associated with manually controlling the autonomous vehicle 200 via the vehicle control device 240. For instance, in some implementations, the one or more input devices 500 can include an input device (e.g., press-button, switch, GUI element), the passenger interacts with to provide a user-input associated with moving the first passenger seat from the first position to the second position or vice versa. In some implementations, the one or more input devices can include one or more microphones disposed with the interior of the autonomous vehicle and operable to detect audio data indicative of one or more voice commands associated with moving the first passenger seat. It should be understood, however, that the one or more input devices 500 can include any suitable type of input device that can be used by a passenger to provide user-input associated with configuring the interior 202 of the autonomous vehicle 200 to allow the passenger to manually control the autonomous vehicle using the vehicle control device 240.

As shown, the vehicle computing system 112 can be communicatively coupled to one or more electric motors 510 positioned onboard the autonomous vehicle 200. The one or more electric motors 510 can be operable drive one or more actuators (not shown) to move the first passenger seat 270, the second passenger seat 280, or both. In this manner, the vehicle computing system 112 can provide one or more control signals to the electric motor(s) 510 to control movement of the first passenger seat 270 and/or the second passenger seat 280 to configure the interior 202 of the autonomous vehicle 200 as needed. In particular, the one or more control signals can be associated with moving the first passenger seat 270 and/or the second passenger seat 280 to allow the passenger to manually control the autonomous vehicle 200 using the vehicle control device 240. Alternatively, the one or more control signals can be associated with moving the first passenger seat 270 and/or the second passenger seat 280 to prevent the passenger from accessing the vehicle control device 240.

In some implementations, the one or more electric motors 510 can be operable to drive one or more actuators to move the vehicle control device 240. In this manner, the vehicle computing system 112 can provide one or more control signals to the electric motor(s) 510 to control movement of the vehicle control device 240. In particular, the one or more control signals can be associated with moving the vehicle control device 240 form the stowed position to the deployed position to allow the passenger to access the vehicle control device 240. Alternatively, the one or more control signals can be associated with moving the vehicle control device 240 from the deployed position to the stowed position to prevent the passenger from accessing the vehicle control device 240.

The vehicle computing system 112 can include one or computing device(s) 1910. The computing device(s) 1910 of the vehicle computing system 112 can include processor(s) 1915 and a memory 1920. The one or more processor(s) 1915 can be any suitable processing device (e.g., a processor core, a microprocessor, an ASIC, a FPGA, a controller, a microcontroller, etc.) and can be one processor or a plurality of processors that are operatively connected. The memory 1920 can include one or more non-transitory computer-readable storage media, such as RAM, ROM, EEPROM, EPROM, one or more memory devices, flash memory devices, etc., and/or combinations thereof.

The memory 1920 can store information that can be obtained by the one or more processor(s) 1915. For instance, the memory 1920 (e.g., one or more non-transitory computer-readable storage mediums, memory devices, etc.) can include computer-readable instructions 1925 that can be executed by the one or more processors 1915. The instructions 1925 can be software written in any suitable programming language or can be implemented in hardware. Additionally, or alternatively, the instructions 1925 can be executed in logically and/or virtually separate threads on processor(s) 1915.

For example, the memory 1920 can store instructions 1925 that when executed by the one or more processors 1915 cause the one or more processors 1915 (e.g., of the vehicle computing system 112) to perform operations such as any of the operations and functions of the vehicle computing system 112 and/or for which the vehicle computing system 112 is configured, as described herein, the operations for configuring an autonomous vehicle to be manually controlled via a vehicle control device of the autonomous vehicle (e.g., one or more portions of method 600), and/or any other operations and functions, as described herein.

The memory 1920 can store data 1930 that can be obtained (e.g., received, accessed, written, manipulated, generated, created, stored, etc.). The data 1930 can include, for instance, sensor data, map data, state data, prediction data, motion planning data, data associated with one or more user(s) (user preferences, etc.), data associated with one or more service assignments(s) (start location, end location, convenience factors, etc.), data associated with one or more autonomous vehicles (e.g., autonomous vehicle operational capabilities, vehicle location, etc.), data associated with one or more seating positions, data associated with lock and unlock states of seat(s), control devices, and/or other mechanisms, and/or other data/information described herein. In some implementations, the computing device(s) 1910 can obtain data from one or more memories that are remote from the vehicle computing system 112.

The computing device(s) 1910 can also include a communication interface 1935 used to communicate with one or more other system(s) (e.g., other systems onboard and/or remote from a vehicle, etc.). The communication interface 1935 can include any circuits, components, software, etc. for communicating via one or more networks that the vehicle computing system 112, electric motors 510, and/or input devices can use for communication (e.g., local area network, wide area network, the Internet, secure network, cellular network, mesh network, peer-to-peer communication link, some combination thereof and can include any number of wired or wireless links, etc.). In some implementations, the communication interface 1935 can include, for example, one or more of a communications controller, receiver, transceiver, transmitter, port, conductors, software and/or hardware for communicating data/information.

Figure 20:
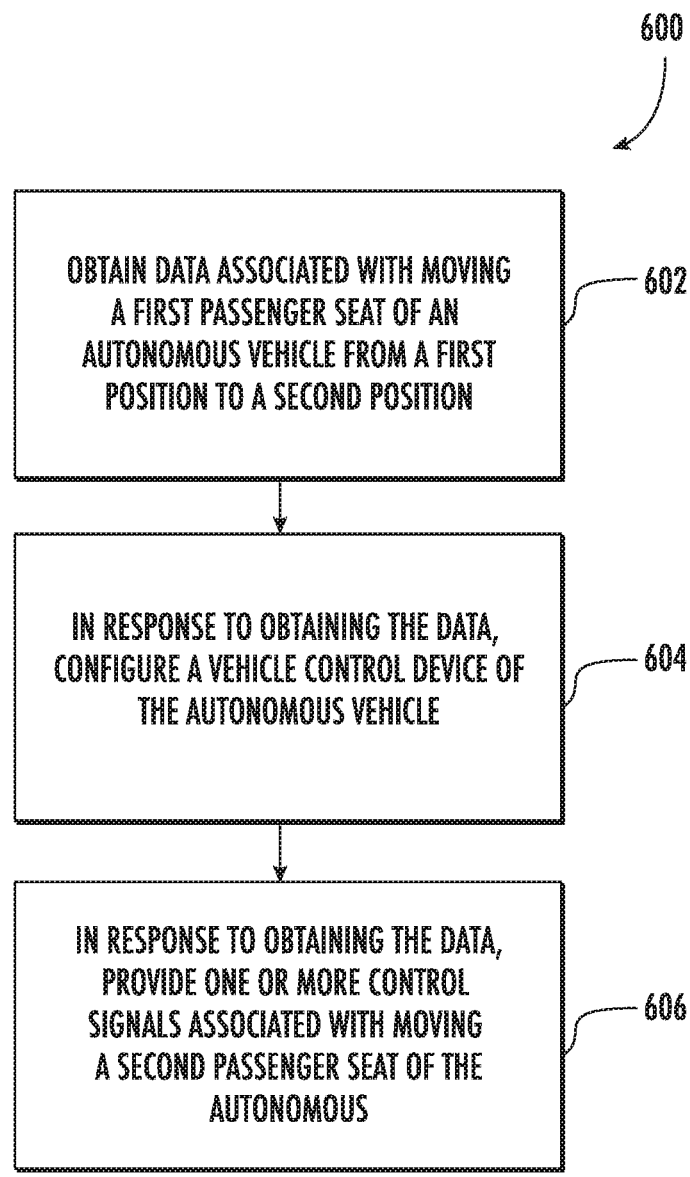
FIG. 20 depicts a flow diagram of a method for configuring an autonomous vehicle to be manually controlled via a vehicle control device of the autonomous vehicle according to example embodiments of the present disclosure.

FIG. 20 depicts a flowchart diagram of an example method 800 of configuring an autonomous vehicle comprising a first passenger seat and a second passenger seat to be manually controlled via a vehicle control device of the autonomous vehicle. One or more portion(s) of the method 600 can be implemented by a computing system that includes one or more computing devices such as, for example, the computing systems described with reference to the other figures (e.g., the vehicle computing system 112, the operations computing system 104, the one or more remote computing devices 106, etc.). Each respective portion of the method 600 can be performed by any (or any combination) of one or more computing devices. Moreover, one or more portion(s) of the method 600 can be implemented as an algorithm on the hardware components of the device(s) described herein to, for example, configure the interior of the autonomous vehicle to allow a passenger riding in the autonomous vehicle to manually control the autonomous vehicle using a vehicle control device. FIG. 20 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 20 is described with reference to elements/terms described with respect to other systems and figures for exemplary illustrated purposes and is not meant to be limiting. One or more portions of method 600 can be performed additionally, or alternatively, by other systems.

At (602), the method 600 can include obtaining, by a vehicle computing system including one or more processors, data associated with moving the first passenger seat of the autonomous vehicle from a first position in which a seating orientation of the first passenger seat faces a rear end of the autonomous vehicle to a second position in which the seating orientation of the first passenger seat faces a front end of the autonomous vehicle. In some implementations, the data associated with moving the first passenger seat of the autonomous vehicle is associated with at least one of a user-request to move the first passenger seat from the first position to the second position, a user-request to manually operate the autonomous vehicle, or detection of a failure event associated with the autonomous vehicle. In response to obtaining the data at (602), the method 600 can proceed to (604).

At (604), the method 600 can include configuring, by the vehicle computing system, the vehicle control device to allow the autonomous vehicle to be manually controlled via the vehicle control device. In some implementations, configuring the vehicle control device can include providing, by the vehicle computing system, one or more control signals associated with moving the steering device from a stowed position to a deployed position, as described herein.

At (606), the method 600 can include, in response to obtaining the data at (602), providing, by the vehicle computing system, one or more control signals associated with moving the second passenger seat facing the rear end of the autonomous vehicle along a track such that a seatback of the first passenger seat and a seatback of the second passenger seat are spaced apart from one another along a longitudinal direction of the autonomous vehicle. In this manner, the second passenger seat can be moved along the track until the second passenger seat does not block the passenger's view out a passenger side window of the autonomous vehicle.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

Computing tasks discussed herein as being performed at computing device(s) remote from an autonomous vehicle can instead be performed at the vehicle or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

What is claimed is:

1. An autonomous vehicle defining a longitudinal direction and a lateral direction, the autonomous vehicle having a forward end and a rear end spaced apart from the forward end along the longitudinal direction, the autonomous vehicle comprising:
    a vehicle control device positioned proximate the forward end;
    a first passenger seat in a row of passenger seats, the first passenger seat defining a seating orientation, the first passenger seat configurable between at least a first position in which the seating orientation is directed towards the rear end of the autonomous vehicle to substantially obscure the vehicle control device from access from a passenger compartment of the autonomous vehicle and a second position in which the seating orientation is directed towards the forward end of the autonomous vehicle to allow access to the vehicle control device from the passenger compartment; and
    a second passenger seat in the row of passenger seats, the second passenger seat facing the rear end of the autonomous vehicle, the second passenger seat movable along the longitudinal direction of the autonomous vehicle between a third position in which a seatback of the second passenger seat is positioned between the forward end of the autonomous vehicle and a pillar of the autonomous vehicle and a fourth position in which the seatback of the second passenger seat is positioned between the pillar and the rear end of the autonomous vehicle, the second passenger seat movable between the third position and the fourth position based on a position of the first passenger seat.

2. The autonomous vehicle of claim 1, wherein in the first position, a seatback of the first passenger seat is spaced apart from the vehicle control device along the longitudinal direction by a distance of four inches or less.

3. The autonomous vehicle of claim 1, wherein in the first position, a seatback of the first passenger seat contacts the vehicle control device.

4. The autonomous vehicle of claim 1, wherein the vehicle control device comprises a steering device.

5. The autonomous vehicle of claim 4, wherein
    the steering device is movable between a stowed position in which the steering device is disposed entirely within an interior of a dashboard of the autonomous vehicle and a deployed position in which the steering device is at least partially disposed outside of the interior of the dashboard.

6. The autonomous vehicle of claim 5, wherein the steering device enters and exits the interior of the dashboard through an opening defined by the dashboard.

7. The autonomous vehicle of claim 6, wherein
    the steering device has a first shape in the stowed position and a second shape in the deployed position, the second shape being different than the first shape.

8. The autonomous vehicle of claim 1, wherein the first passenger seat is movable between at least the first position and the second position while the first passenger seat is coupled to a floorboard of the autonomous vehicle.

9. The autonomous vehicle of claim 1, wherein in the first position, a seatback of the first passenger seat is positioned between the forward end of the autonomous vehicle and the pillar of the autonomous vehicle along the longitudinal direction.

10. The autonomous vehicle of claim 9, wherein:
    the first passenger seat is movable along the longitudinal direction via a first track defined, at least in part, by a floorboard of the autonomous vehicle; and
    the second passenger seat is movable along the longitudinal direction via a second track defined, at least in part, by the floorboard.

11. The autonomous vehicle of claim 9, wherein in the second position, a seatback of the first passenger seat is positioned between the pillar of the autonomous vehicle and the rear end of the autonomous vehicle along the longitudinal direction.

12. The autonomous vehicle of claim 1, wherein the vehicle control device comprises a display device having a display screen.

13. The autonomous vehicle of claim 1, wherein the vehicle control device comprises one or more input devices configured to receive a manual user-input associated with accelerating or braking the autonomous vehicle.

14. The autonomous vehicle of claim 1, wherein:
    the second passenger seat is in the third position when the position of the first passenger seat corresponds to the first position; and
    the second passenger seat is in the fourth position when the position of the first passenger seat corresponds to the second position.

15. The autonomous vehicle of claim 1, wherein the second passenger seat is wider than the first passenger seat.

16. A method of configuring an autonomous vehicle to be manually controlled via a vehicle control device of the autonomous vehicle, the method comprising:
    obtaining, by a vehicle computing system comprising one or more processors, data associated with moving a first passenger seat in a row of passenger seats of the autonomous vehicle from a first position in which a seating orientation of the first passenger seat faces a rear end of the autonomous vehicle to a second position in which the seating orientation of the first passenger seat faces a forward end of the autonomous vehicle;

responsive to obtaining the data, configuring, by the vehicle computing system, the vehicle control device to allow the autonomous vehicle to be manually controlled via the vehicle control device; and responsive to obtaining the data, providing, by the vehicle computing system, one or more control signals associated with moving a second passenger seat in the row of passenger seats and facing the rear end of the autonomous vehicle along a longitudinal direction of the autonomous vehicle from a third position in which a seatback of the second passenger seat is positioned between the forward end of the autonomous vehicle and a pillar of the autonomous vehicle along the longitudinal direction to a fourth position in which the seatback of the second passenger seat is positioned between the pillar of the autonomous vehicle and the rear end of the autonomous vehicle along the longitudinal direction.

17. The method of claim 16, wherein the data associated with moving the first passenger seat of the autonomous vehicle is associated with at least one of a user-request to move the first passenger seat from the first position to the second position, a user-request to manually operate the autonomous vehicle, or detection of a failure event associated with the autonomous vehicle.

18. The method of claim 16, wherein the vehicle control device comprises a steering device.

19. The method of claim 18, wherein configuring the vehicle control device comprises providing, by the vehicle computing system, one or more control signals associated with moving the steering device from a stowed position to a deployed position.

20. An interior of an autonomous vehicle defining a longitudinal direction and a lateral direction, the autonomous vehicle having a forward end and a rear end spaced apart from the forward end along the longitudinal direction, the interior comprising:

a vehicle control device positioned proximate the forward end;

a first passenger seat in a row of passenger seats, the first passenger seat defining a seating orientation, the first passenger seat configurable between at least a first position in which the seating orientation is directed towards the rear end of the autonomous vehicle to substantially obscure the vehicle control device from access from a passenger compartment of the autonomous vehicle and a second position in which the seating orientation is directed towards the forward end of the autonomous vehicle to allow access to the vehicle control device from the passenger compartment; and a second passenger seat in the row of passenger seats, the second passenger seat facing the rear end of the autonomous vehicle, the second passenger seat movable along the longitudinal direction of the autonomous vehicle between a third position in which a seatback of the second passenger seat is positioned between the forward end of the autonomous vehicle and a pillar of the autonomous vehicle and a fourth position in which the seatback of the second passenger seat is positioned between the pillar and the rear end of the autonomous vehicle.

* * * * *